United States Patent
Mosko et al.

(10) Patent No.: US 9,800,637 B2
(45) Date of Patent: Oct. 24, 2017

(54) SYSTEM AND METHOD FOR ALL-IN-ONE CONTENT STREAM IN CONTENT-CENTRIC NETWORKS

(71) Applicant: CISCO TECHNOLOGY, INC., San Jose, CA (US)

(72) Inventors: Marc E. Mosko, Santa Cruz, CA (US); Ignacio Solis, South San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 383 days.

(21) Appl. No.: 14/463,450

(22) Filed: Aug. 19, 2014

(65) Prior Publication Data

US 2016/0057189 A1 Feb. 25, 2016

(51) Int. Cl.
*G06F 15/16* (2006.01)
*H04L 29/06* (2006.01)
*H04L 29/08* (2006.01)
*H04N 21/266* (2011.01)
(Continued)

(52) U.S. Cl.
CPC .............. *H04L 65/60* (2013.01); *H04L 67/02* (2013.01); *H04L 67/10* (2013.01); *H04L 67/16* (2013.01); *H04L 67/2857* (2013.01); *H04L 67/327* (2013.01); *H04N 21/2665* (2013.01);
(Continued)

(58) Field of Classification Search
CPC ......... H04L 65/60; H04L 67/02; H04L 67/10; H04L 67/2857
See application file for complete search history.

(56) References Cited

U.S. PATENT DOCUMENTS

| 817,441 A | 4/1906 | Niesz |
|---|---|---|
| 4,309,569 A | 1/1982 | Merkle |
| 4,921,898 A | 5/1990 | Lenney |

(Continued)

FOREIGN PATENT DOCUMENTS

| CN | 103873371 | 6/2014 |
|---|---|---|
| DE | 1720277 A1 | 6/1967 |

(Continued)

OTHER PUBLICATIONS

Amadeo et al. "Design and Analysis of a Transport-Level Solution for Content-Centric VANETs", University "Mediterranea" of Reggio Calabria, Jun. 15, 2013.

(Continued)

*Primary Examiner* — Liangche A Wang
*Assistant Examiner* — Ayele Woldemariam

(57) ABSTRACT

One embodiment of the present invention provides a system for assembling a single content stream that enables downloading of a content collection using the single content stream over a network. During operation, the system obtains the content collection that includes a plurality of content components, and generates a manifest for the content collection. A respective entry in the manifest corresponds to a content component. The system assembles the single content stream by including the manifest followed by the plurality of content components. The manifest and the content components are packaged into objects under a same namespace, thereby facilitating a requester requesting one or more content components within the content collection using interests under the same namespace.

18 Claims, 10 Drawing Sheets

(51) Int. Cl.
*H04N 21/2665* (2011.01)
*H04L 29/12* (2006.01)
(52) U.S. Cl.
CPC ... *H04N 21/26603* (2013.01); *H04L 61/1582* (2013.01); *H04L 61/30* (2013.01); *H04L 63/123* (2013.01)

(56) References Cited

U.S. PATENT DOCUMENTS

| | | | |
|---|---|---|---|
| 5,070,134 A | 12/1991 | Oyamada |
| 5,110,856 A | 5/1992 | Oyamada |
| 5,214,702 A | 5/1993 | Fischer |
| 5,377,354 A | 12/1994 | Scannell |
| 5,506,844 A | 4/1996 | Rao |
| 5,629,370 A | 5/1997 | Freidzon |
| 5,845,207 A | 12/1998 | Amin |
| 5,870,605 A | 2/1999 | Bracho |
| 6,047,331 A | 4/2000 | Medard |
| 6,052,683 A | 4/2000 | Irwin |
| 6,085,320 A | 7/2000 | Kaliski, Jr. |
| 6,091,724 A | 7/2000 | Chandra |
| 6,128,623 A | 10/2000 | Mattis |
| 6,128,627 A | 10/2000 | Mattis |
| 6,173,364 B1 | 1/2001 | Zenchelsky |
| 6,209,003 B1 | 3/2001 | Mattis |
| 6,226,618 B1 | 5/2001 | Downs |
| 6,233,617 B1 | 5/2001 | Rothwein |
| 6,233,646 B1 | 5/2001 | Hahm |
| 6,289,358 B1 | 9/2001 | Mattis |
| 6,292,880 B1 | 9/2001 | Mattis |
| 6,332,158 B1 | 12/2001 | Risley |
| 6,363,067 B1 | 3/2002 | Chung |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,732,273 B1 | 5/2004 | Byers |
| 6,769,066 B1 | 7/2004 | Botros |
| 6,772,333 B1 | 8/2004 | Brendel |
| 6,775,258 B1 | 8/2004 | vanValkenburg |
| 6,862,280 B1 | 3/2005 | Bertagna |
| 6,901,452 B1 | 5/2005 | Bertagna |
| 6,915,307 B1 | 7/2005 | Mattis |
| 6,917,985 B2 | 7/2005 | Madruga |
| 6,957,228 B1 | 10/2005 | Graser |
| 6,968,393 B1 | 11/2005 | Chen |
| 6,981,029 B1 | 12/2005 | Menditto |
| 7,007,024 B2 | 2/2006 | Zelenka |
| 7,013,389 B1 | 3/2006 | Srivastava |
| 7,031,308 B2 | 4/2006 | Garcia-Luna-Aceves |
| 7,043,637 B2 | 5/2006 | Bolosky |
| 7,061,877 B1 | 6/2006 | Gummalla |
| 7,080,073 B1 | 7/2006 | Jiang |
| RE39,360 E | 10/2006 | Aziz |
| 7,149,750 B2 | 12/2006 | Chadwick |
| 7,152,094 B1 | 12/2006 | Jannu |
| 7,177,646 B2 | 2/2007 | ONeill |
| 7,206,860 B2 | 4/2007 | Murakami |
| 7,206,861 B2 | 4/2007 | Callon |
| 7,210,326 B2 | 5/2007 | Kawamoto |
| 7,246,159 B2 | 7/2007 | Aggarwal |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,362,727 B1 | 4/2008 | ONeill |
| 7,382,787 B1 | 6/2008 | Barnes |
| 7,395,507 B2 | 7/2008 | Robarts |
| 7,430,755 B1 | 9/2008 | Hughes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,542,471 B2 | 6/2009 | Samuels |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,564,812 B1 | 7/2009 | Elliott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,636,767 B2 | 12/2009 | Lev-Ran |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,698,559 B1 | 4/2010 | Chaudhury |
| 7,769,887 B1 | 8/2010 | Bhattacharyya |
| 7,779,467 B2 | 8/2010 | Choi |
| 7,801,069 B2 | 9/2010 | Cheung |
| 7,801,177 B2 | 9/2010 | Luss |
| 7,816,441 B2 | 10/2010 | Elizalde |
| 7,831,733 B2 | 11/2010 | Sultan |
| 7,873,619 B1 | 1/2011 | Faibish |
| 7,908,337 B2 | 3/2011 | Garcia-Luna-Aceves |
| 7,924,837 B1 | 4/2011 | Shabtay |
| 7,953,014 B2 | 5/2011 | Toda |
| 7,953,116 B2 * | 5/2011 | Cohn ................ G06F 17/30887 707/999.1 |
| 7,953,885 B1 | 5/2011 | Devireddy |
| 7,979,912 B1 | 7/2011 | Roka |
| 8,000,267 B2 | 8/2011 | Solis |
| 8,010,691 B2 | 8/2011 | Kollmansberger |
| 8,069,023 B1 | 11/2011 | Frailong |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,271,687 B2 | 9/2012 | Turner |
| 8,312,064 B1 | 11/2012 | Gauvin |
| 8,332,357 B1 | 12/2012 | Chung |
| 8,386,622 B2 | 2/2013 | Jacobson |
| 8,447,851 B1 | 5/2013 | Anderson |
| 8,462,781 B2 | 6/2013 | McGhee |
| 8,467,297 B2 | 6/2013 | Liu |
| 8,473,633 B2 | 6/2013 | Eardley |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,677,451 B1 | 3/2014 | Bhimaraju |
| 8,688,619 B1 | 4/2014 | Ezick |
| 8,699,350 B1 | 4/2014 | Kumar |
| 8,718,055 B2 | 5/2014 | Vasseur |
| 8,750,820 B2 | 6/2014 | Allan |
| 8,761,022 B2 | 6/2014 | Chiabaut |
| 8,762,477 B2 | 6/2014 | Xie |
| 8,762,564 B1 * | 6/2014 | Philpott ............ H04L 65/4084 709/219 |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,861,356 B2 | 10/2014 | Kozat |
| 8,862,774 B2 | 10/2014 | Vasseur |
| 8,868,779 B2 | 10/2014 | ONeill |
| 8,874,842 B1 | 10/2014 | Kimmel |
| 8,880,682 B2 | 11/2014 | Bishop |
| 8,903,756 B2 | 12/2014 | Zhao |

(56) References Cited

U.S. PATENT DOCUMENTS

| | | |
|---|---|---|
| 8,923,293 B2 | 12/2014 | Jacobson |
| 8,934,496 B2 | 1/2015 | Vasseur |
| 8,937,865 B1 | 1/2015 | Kumar |
| 8,972,969 B2 | 3/2015 | Gaither |
| 8,977,596 B2 | 3/2015 | Montulli |
| 9,002,921 B2 | 4/2015 | Westphal |
| 9,032,095 B1 | 5/2015 | Traina |
| 9,071,498 B2 | 6/2015 | Beser |
| 9,112,895 B1 | 8/2015 | Lin |
| 9,137,152 B2 | 9/2015 | Xie |
| 9,253,087 B2 | 2/2016 | Zhang |
| 9,270,598 B1 | 2/2016 | Oran |
| 9,280,610 B2 | 3/2016 | Gruber |
| 9,432,431 B2 * | 8/2016 | O'Malley ............ H04L 65/602 |
| 2002/0002680 A1 | 1/2002 | Carbajal |
| 2002/0010795 A1 | 1/2002 | Brown |
| 2002/0038296 A1 | 3/2002 | Margolus |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0152305 A1 | 10/2002 | Jackson |
| 2002/0176404 A1 | 11/2002 | Girard |
| 2002/0188605 A1 | 12/2002 | Adya |
| 2002/0199014 A1 | 12/2002 | Yang |
| 2003/0004621 A1 | 1/2003 | Bousquet |
| 2003/0009365 A1 | 1/2003 | Tynan |
| 2003/0033394 A1 | 2/2003 | Stine |
| 2003/0046396 A1 | 3/2003 | Richter |
| 2003/0046421 A1 | 3/2003 | Horvitz et al. |
| 2003/0046437 A1 | 3/2003 | Eytchison |
| 2003/0048793 A1 | 3/2003 | Pochon |
| 2003/0051100 A1 | 3/2003 | Patel |
| 2003/0061384 A1 | 3/2003 | Nakatani |
| 2003/0074472 A1 | 4/2003 | Lucco |
| 2003/0088696 A1 | 5/2003 | McCanne |
| 2003/0097447 A1 | 5/2003 | Johnston |
| 2003/0099237 A1 | 5/2003 | Mitra |
| 2003/0140257 A1 | 7/2003 | Peterka |
| 2003/0229892 A1 | 12/2003 | Sardera |
| 2004/0024879 A1 | 2/2004 | Dingman |
| 2004/0030602 A1 | 2/2004 | Rosenquist |
| 2004/0064737 A1 | 4/2004 | Milliken |
| 2004/0071140 A1 | 4/2004 | Jason |
| 2004/0073617 A1 | 4/2004 | Milliken |
| 2004/0073715 A1 | 4/2004 | Folkes |
| 2004/0139230 A1 | 7/2004 | Kim |
| 2004/0196783 A1 | 10/2004 | Shinomiya |
| 2004/0218548 A1 | 11/2004 | Kennedy |
| 2004/0221047 A1 | 11/2004 | Grover |
| 2004/0225627 A1 | 11/2004 | Botros |
| 2004/0233916 A1 | 11/2004 | Takeuchi |
| 2004/0246902 A1 | 12/2004 | Weinstein |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0132207 A1 | 6/2005 | Mourad |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0281288 A1 | 12/2005 | Banerjee |
| 2005/0286535 A1 | 12/2005 | Shrum |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0146686 A1 | 7/2006 | Kim |
| 2006/0173831 A1 | 8/2006 | Basso |
| 2006/0193295 A1 | 8/2006 | White |
| 2006/0203804 A1 | 9/2006 | Whitmore |
| 2006/0206445 A1 | 9/2006 | Andreoli |
| 2006/0215684 A1 | 9/2006 | Capone |
| 2006/0223504 A1 | 10/2006 | Ishak |
| 2006/0242155 A1 | 10/2006 | Moore |
| 2006/0256767 A1 | 11/2006 | Suzuki |
| 2006/0268667 A1 * | 11/2006 | Jellison, Jr. ....... G06F 17/30056 |
| | | 707/E17.031 |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0171828 A1 | 7/2007 | Dalal |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255677 A1 | 11/2007 | Alexander |
| 2007/0255699 A1 | 11/2007 | Sreenivas |
| 2007/0255781 A1 | 11/2007 | Li |
| 2007/0274504 A1 | 11/2007 | Maes |
| 2007/0275701 A1 | 11/2007 | Jonker |
| 2007/0276907 A1 | 11/2007 | Maes |
| 2007/0283158 A1 | 12/2007 | Danseglio |
| 2007/0294187 A1 | 12/2007 | Scherrer |
| 2008/0005056 A1 | 1/2008 | Stelzig |
| 2008/0005223 A1 | 1/2008 | Flake |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0082662 A1 | 4/2008 | Dandliker |
| 2008/0095159 A1 | 4/2008 | Suzuki |
| 2008/0101357 A1 | 5/2008 | Iovanna |
| 2008/0107034 A1 | 5/2008 | Jetcheva |
| 2008/0107259 A1 | 5/2008 | Satou |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0165775 A1 | 7/2008 | Das |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0250006 A1 | 10/2008 | Dettinger |
| 2008/0256138 A1 | 10/2008 | Sim-Tang |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0291923 A1 | 11/2008 | Back |
| 2008/0298376 A1 | 12/2008 | Takeda |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |

(56) References Cited

U.S. PATENT DOCUMENTS

| | | |
|---|---|---|
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0116393 A1 | 5/2009 | Hughes |
| 2009/0117922 A1 | 5/2009 | Bell |
| 2009/0132662 A1 | 5/2009 | Sheridan |
| 2009/0135728 A1 | 5/2009 | Shen |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0198832 A1 | 8/2009 | Shah |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0274158 A1 | 11/2009 | Sharp |
| 2009/0276396 A1 | 11/2009 | Gorman |
| 2009/0285209 A1 | 11/2009 | Stewart |
| 2009/0287835 A1 | 11/2009 | Jacobson |
| 2009/0287853 A1 | 11/2009 | Carson |
| 2009/0288076 A1 | 11/2009 | Johnson |
| 2009/0288143 A1 | 11/2009 | Stebila |
| 2009/0288163 A1 | 11/2009 | Jacobson |
| 2009/0292743 A1 | 11/2009 | Bigus |
| 2009/0293121 A1 | 11/2009 | Bigus |
| 2009/0296719 A1 | 12/2009 | Maier |
| 2009/0300079 A1 | 12/2009 | Shitomi |
| 2009/0300407 A1 | 12/2009 | Kamath |
| 2009/0300512 A1 | 12/2009 | Ahn |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0058346 A1 | 3/2010 | Narang |
| 2010/0088370 A1 | 4/2010 | Wu |
| 2010/0094767 A1 | 4/2010 | Miltonberger |
| 2010/0094876 A1 | 4/2010 | Huang |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0217985 A1 | 8/2010 | Fahrny |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0257149 A1 | 10/2010 | Cognigni |
| 2010/0268782 A1 | 10/2010 | Zombek |
| 2010/0272107 A1 | 10/2010 | Papp |
| 2010/0281263 A1 | 11/2010 | Ugawa |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0019674 A1 | 1/2011 | Iovanna |
| 2011/0022812 A1 | 1/2011 | vanderLinden |
| 2011/0029952 A1 | 2/2011 | Harrington |
| 2011/0055392 A1 | 3/2011 | Shen |
| 2011/0055921 A1 | 3/2011 | Narayanaswamy |
| 2011/0060716 A1 | 3/2011 | Forman |
| 2011/0060717 A1 | 3/2011 | Forman |
| 2011/0090908 A1 | 4/2011 | Jacobson |
| 2011/0106755 A1 | 5/2011 | Hao |
| 2011/0131308 A1 | 6/2011 | Eriksson |
| 2011/0137919 A1 | 6/2011 | Ryu |
| 2011/0145597 A1 | 6/2011 | Yamaguchi |
| 2011/0145858 A1 | 6/2011 | Philpott |
| 2011/0149858 A1 | 6/2011 | Hwang |
| 2011/0153840 A1 | 6/2011 | Narayana |
| 2011/0158122 A1 | 6/2011 | Murphy |
| 2011/0161408 A1 | 6/2011 | Kim |
| 2011/0202609 A1 | 8/2011 | Chaturvedi |
| 2011/0219093 A1 | 9/2011 | Ragunathan |
| 2011/0219427 A1 | 9/2011 | Hito |
| 2011/0219727 A1 | 9/2011 | May |
| 2011/0225293 A1 | 9/2011 | Rathod |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265159 A1 | 10/2011 | Ronda |
| 2011/0265174 A1 | 10/2011 | Thornton |
| 2011/0271007 A1 | 11/2011 | Wang |
| 2011/0280214 A1 | 11/2011 | Lee |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0023113 A1 | 1/2012 | Ferren |
| 2012/0036180 A1 | 2/2012 | Thornton |
| 2012/0045064 A1 | 2/2012 | Rembarz |
| 2012/0047361 A1 | 2/2012 | Erdmann |
| 2012/0066727 A1 | 3/2012 | Nozoe |
| 2012/0106339 A1 | 5/2012 | Mishra |
| 2012/0110159 A1 | 5/2012 | Richardson |
| 2012/0114313 A1 | 5/2012 | Phillips |
| 2012/0120803 A1 | 5/2012 | Farkas |
| 2012/0127994 A1 | 5/2012 | Ko |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0166433 A1 | 6/2012 | Tseng |
| 2012/0170913 A1 | 7/2012 | Isozaki |
| 2012/0179653 A1 | 7/2012 | Araki |
| 2012/0197690 A1 | 8/2012 | Agulnek |
| 2012/0198048 A1 | 8/2012 | Ioffe |
| 2012/0198492 A1* | 8/2012 | Dhruv .............. H04N 21/23424 725/32 |
| 2012/0221150 A1 | 8/2012 | Arensmeier |
| 2012/0224487 A1 | 9/2012 | Hui |
| 2012/0226902 A1 | 9/2012 | Kim |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |
| 2012/0291102 A1 | 11/2012 | Cohen |
| 2012/0300669 A1 | 11/2012 | Zahavi |
| 2012/0307629 A1 | 12/2012 | Vasseur |
| 2012/0314580 A1 | 12/2012 | Hong |
| 2012/0317307 A1 | 12/2012 | Ravindran |
| 2012/0322422 A1 | 12/2012 | Frecks |
| 2012/0323933 A1 | 12/2012 | He |
| 2012/0331112 A1 | 12/2012 | Chatani |

(56) References Cited

U.S. PATENT DOCUMENTS

| | | |
|---|---|---|
| 2013/0024560 A1 | 1/2013 | Vasseur |
| 2013/0041982 A1 | 2/2013 | Shi |
| 2013/0051392 A1 | 2/2013 | Filsfils |
| 2013/0054971 A1 | 2/2013 | Yamaguchi |
| 2013/0060962 A1 | 3/2013 | Wang |
| 2013/0061084 A1 | 3/2013 | Barton |
| 2013/0066823 A1 | 3/2013 | Sweeney |
| 2013/0073552 A1 | 3/2013 | Rangwala |
| 2013/0073882 A1 | 3/2013 | Inbaraj |
| 2013/0074155 A1 | 3/2013 | Huh |
| 2013/0090942 A1 | 4/2013 | Robinson |
| 2013/0091539 A1 | 4/2013 | Khurana |
| 2013/0110987 A1 | 5/2013 | Kim |
| 2013/0111063 A1 | 5/2013 | Lee |
| 2013/0128786 A1 | 5/2013 | Sultan |
| 2013/0132719 A1 | 5/2013 | Kobayashi |
| 2013/0139245 A1 | 5/2013 | Thomas |
| 2013/0151584 A1 | 6/2013 | Westphal |
| 2013/0151646 A1 | 6/2013 | Chidambaram |
| 2013/0152070 A1 | 6/2013 | Bhullar |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0182931 A1 | 7/2013 | Fan |
| 2013/0185406 A1 | 7/2013 | Choi |
| 2013/0191412 A1 | 7/2013 | Kitamura |
| 2013/0197698 A1 | 8/2013 | Shah |
| 2013/0198119 A1 | 8/2013 | Eberhardt, III |
| 2013/0212185 A1 | 8/2013 | Pasquero |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227048 A1 | 8/2013 | Xie |
| 2013/0227114 A1 | 8/2013 | Vasseur |
| 2013/0227166 A1 | 8/2013 | Ravindran |
| 2013/0242996 A1 | 9/2013 | Varvello |
| 2013/0250809 A1 | 9/2013 | Hui |
| 2013/0262365 A1 | 10/2013 | Dolbear |
| 2013/0262698 A1 | 10/2013 | Schwan |
| 2013/0282854 A1 | 10/2013 | Jang |
| 2013/0282860 A1 | 10/2013 | Zhang |
| 2013/0282920 A1 | 10/2013 | Zhang |
| 2013/0304758 A1 | 11/2013 | Gruber |
| 2013/0304937 A1 | 11/2013 | Lee |
| 2013/0325888 A1 | 12/2013 | Oneppo |
| 2013/0329696 A1 | 12/2013 | Xu |
| 2013/0332971 A1 | 12/2013 | Fisher |
| 2013/0336103 A1 | 12/2013 | Vasseur |
| 2013/0336323 A1 | 12/2013 | Srinivasan |
| 2013/0339481 A1 | 12/2013 | Hong |
| 2013/0343408 A1 | 12/2013 | Cook |
| 2014/0003232 A1 | 1/2014 | Guichard |
| 2014/0003424 A1 | 1/2014 | Matsuhira |
| 2014/0006354 A1 | 1/2014 | Parkison |
| 2014/0006565 A1 | 1/2014 | Muscariello |
| 2014/0029445 A1 | 1/2014 | Hui |
| 2014/0032714 A1 | 1/2014 | Liu |
| 2014/0033193 A1 | 1/2014 | Palaniappan |
| 2014/0040505 A1 | 2/2014 | Barton |
| 2014/0040628 A1 | 2/2014 | Fort |
| 2014/0043987 A1 | 2/2014 | Watve |
| 2014/0047513 A1 | 2/2014 | vantNoordende |
| 2014/0074730 A1 | 3/2014 | Arensmeier |
| 2014/0075567 A1 | 3/2014 | Raleigh |
| 2014/0082135 A1 | 3/2014 | Jung |
| 2014/0082661 A1 | 3/2014 | Krahnstoever |
| 2014/0089454 A1 | 3/2014 | Jeon |
| 2014/0096249 A1 | 4/2014 | Dupont |
| 2014/0098685 A1 | 4/2014 | Shattil |
| 2014/0108313 A1 | 4/2014 | Heidasch |
| 2014/0108474 A1 | 4/2014 | David |
| 2014/0115037 A1 | 4/2014 | Liu |
| 2014/0122587 A1 | 5/2014 | Petker et al. |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0173076 A1 | 6/2014 | Ravindran |
| 2014/0181140 A1 | 6/2014 | Kim |
| 2014/0192677 A1 | 7/2014 | Chew |
| 2014/0192717 A1 | 7/2014 | Liu |
| 2014/0195328 A1 | 7/2014 | Ferens |
| 2014/0195641 A1 | 7/2014 | Wang |
| 2014/0195666 A1 | 7/2014 | Dumitriu |
| 2014/0204945 A1 | 7/2014 | Byun |
| 2014/0214942 A1 | 7/2014 | Ozonat |
| 2014/0233575 A1 | 8/2014 | Xie |
| 2014/0237085 A1 | 8/2014 | Park |
| 2014/0237095 A1 | 8/2014 | Bevilacqua-Linn |
| 2014/0245359 A1 | 8/2014 | DeFoy |
| 2014/0254595 A1 | 9/2014 | Luo |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0298248 A1 | 10/2014 | Kang |
| 2014/0314093 A1 | 10/2014 | You |
| 2014/0337276 A1 | 11/2014 | Iordanov |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0033365 A1 | 1/2015 | Mellor |
| 2015/0039890 A1 | 2/2015 | Khosravi |
| 2015/0063802 A1 | 3/2015 | Bahadur |
| 2015/0089081 A1 | 3/2015 | Thubert |
| 2015/0095481 A1 | 4/2015 | Ohnishi |
| 2015/0095514 A1 | 4/2015 | Yu |
| 2015/0120663 A1 | 4/2015 | LeScouarnec |
| 2015/0169758 A1 | 6/2015 | Assom |
| 2015/0188770 A1 | 7/2015 | Naiksatam |
| 2015/0195149 A1 | 7/2015 | Vasseur |
| 2015/0207633 A1 | 7/2015 | Ravindran |
| 2015/0207864 A1 | 7/2015 | Wilson |
| 2015/0279348 A1 | 10/2015 | Cao |
| 2015/0288755 A1 | 10/2015 | Mosko |
| 2015/0312300 A1 | 10/2015 | Mosko |
| 2015/0349961 A1 | 12/2015 | Mosko |
| 2015/0372903 A1 | 12/2015 | Hui |
| 2015/0381546 A1 | 12/2015 | Mahadevan |
| 2016/0019275 A1 | 1/2016 | Mosko |
| 2016/0021172 A1 | 1/2016 | Mahadevan |
| 2016/0062840 A1 | 3/2016 | Scott |
| 2016/0110466 A1 | 4/2016 | Uzun |
| 2016/0171184 A1 | 6/2016 | Solis |

FOREIGN PATENT DOCUMENTS

| | | |
|---|---|---|
| DE | 19620817 A1 | 11/1997 |
| EP | 0295727 A2 | 12/1988 |
| EP | 0757065 A2 | 7/1996 |
| EP | 1077422 A2 | 2/2001 |
| EP | 1383265 A1 | 1/2004 |
| EP | 1384729 A1 | 1/2004 |
| EP | 1473889 A2 | 11/2004 |
| EP | 2120402 | 11/2009 |
| EP | 2120419 | 11/2009 |
| EP | 2120419 A2 | 11/2009 |
| EP | 2124415 A2 | 11/2009 |
| EP | 2214357 A1 | 8/2010 |
| EP | 2299754 A1 | 3/2011 |
| EP | 2323346 | 5/2011 |
| EP | 2552083 | 1/2013 |

(56) References Cited

FOREIGN PATENT DOCUMENTS

| | | |
|---|---|---|
| EP | 2214356 | 5/2016 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007122620 | 11/2007 |
| WO | 2007144388 A1 | 12/2007 |
| WO | 2011049890 A1 | 4/2011 |
| WO | 2012077073 A1 | 6/2012 |
| WO | 2013123410 | 8/2013 |
| WO | 2015084327 | 6/2015 |

OTHER PUBLICATIONS

Priya Mahadevan: "CCNx 1.0 Tutorial", Mar. 16, 2014, pp. 1-11, Retrieved from the Internet: http://www.ccnx.org/pubs/hhg/1.2%20CCNx%201.0%20Tutorial.pdf [retrieved on Jun. 8, 2016] *paragraphs [003]-[006], [0011], 100131* *figures 1,2*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* * Section 4.1; p. 4, col. 2* *Section 4.2; p. 4, col. 2*.
Jacobson, Van et al. 'VoCCN: Voice Over Content-Centric Networks.' Dec. 1, 2009. ACM ReArch'09.
Rosenberg, J. "Interactive Connectivity Establishment (ICE): A Protocol for Network Address Translator (NAT) Traversal for Offer/Answer Protocols", Apr. 2010, pp. 1-117.
Shih, Eugene et al., 'Wake on Wireless: An Event Driven Energy Saving Strategy for Battery Operated Devices', Sep. 23, 2002, pp. 160-171.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.
Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"CCNx," http://ccnx.org/. downloaded Mar. 11, 2015.
"Content Delivery Network", Wikipedia, Dec. 10, 2011, http://en.wikipedia.org/w/index.php?title=Content_delivery_network&oldid=465077460.
"Digital Signature" archived on Aug. 31, 2009 at http://web.archive.org/web/20090831170721/http://en.wikipedia.org/wiki/Digital_signature.
"Introducing JSON," http://www.json.org/. downloaded Mar. 11, 2015.
"Microsoft PlayReady," http://www.microsoft.com/playready/. downloaded Mar. 11, 2015.
"Pursuing a pub/sub internet (Pursuit)," http://www.fp7-pursuit.ew/PursuitWeb/. downloaded Mar. 11, 2015.
"The FP7 4WARD project," http://www.4ward-project.eu/. downloaded Mar. 11, 2015.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
B. Ahlgren et al., 'A Survey of Information-centric Networking' IEEE Commun. Magazine, Jul. 2012, pp. 26-36.
B. Lynn$2E.
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM Wkshps), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg. Hierarchical ID-Based Cryptography. Advances in Cryptology—ASIACRYPT 2002. Springer Berlin Heidelberg (2002).
C.A. Wood and E. Uzun, "Flexible end-to-end content security in CCN," in Proc. IEEE CCNC 2014, Las Vegas, CA, USA, Jan. 2014.
Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.
Cho, Jin-Hee, Ananthram Swami, and Ray Chen. "A survey on trust management for mobile ad hoc networks." Communications Surveys & Tutorials, IEEE 13.4 (2011): 562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, Collusi.
D. Boneh and M. Franklin. Identity-Based Encryption from the Weil Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain,

(56) References Cited

OTHER PUBLICATIONS most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencryption Schemes with Applications to Secure Distributed Storage. In the 12th Annual Network and Distributed System Security Sympo.
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
H. Xiong, X. Zhang, W. Zhu, and D. Yao. CloudSeal: End-to$2.
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
https://code.google.com/p/ccnx-trace/.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
L. Wang et al., 'OSPFN: An OSPF Based Routing Protocol for Named Data Networking,' Technical Report NDN-0003, 2012.
L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. EUROCRYPT 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.

(56) References Cited

OTHER PUBLICATIONS

Narasimhan, Sriram, and Lee Brownston. "HyDE—A General Framework for Stochastic and Hybrid Modelbased Diagnosis." Proc. DX 7 (2007): 162-169.

NDN Project [online], http://www.named-data.net/, Downloaded Mar. 9, 2015.

Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.

P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.

R. H. Deng, J. Weng, S. Liu, and K. Chen. Chosen-Ciphertext Secure Proxy Re-Encryption without Pairings. CANS. Spring Lecture Notes in Computer Science vol. 5339 (2008).

S. Chow, J. Weng, Y. Yang, and R. Deng. Efficient Unidirectional Proxy Re-Encryption. Progress in Cryptology—AFRICACRYPT 2010. Springer Berlin Heidelberg (2010).

S. Deering, "Multicast Routing in Internetworks and Extended LANs," Proc. ACM SIGCOMM '88, Aug. 1988.

S. Deering et al., "The Pim architecture for wide-area multicast routing," IEEE/ACM Trans, on Networking, vol. 4, No. 2, Apr. 1996.

S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.

S. Kamara and K. Lauter, "Cryptographic cloud storage," in Proc. FC 2010, Tenerife, Canary Islands, Spain, Jan. 2010, pp. 136-149.

S. Kumar et al. "Peacock Hashing: Deterministic and Updatable Hashing for High Performance Networking," 2008, pp. 556-564.

S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.

S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.

S.J. Lee, M. Gerla, and C. Chiang, "On-demand Multicast Routing Protocol in Multihop Wireless Mobile Networks," Mobile Networks and Applications, vol. 7, No. 6, 2002.

Sandvine, Global Internet Phenomena Report—Spring 2012. Located online at http://www.sandvine.com/downloads/documents/Phenomenal H 2012/Sandvine Global InternetPhenomena Report 1H 2012.pdf.

Scalable and Adaptive Internet Solutions (SAIL) Project [online], http://sail-project.eu/ Downloaded Mar. 9, 2015.

Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.

Shani, Guy, Joelle Pineau, and Robert Kaplow. "A survey of point-based POMDP solvers." Autonomous Agents and Multi-Agent Systems 27.1 (2013): 1-51.

Sheppard, John W., and Stephyn GW Butcher. "A formal analysis of fault diagnosis with d-matrices." Journal of Electronic Testing 23.4 (2007): 309-322.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI. 1993.

T. Ballardie, P. Francis, and J. Crowcroft, "Core Based Trees (CBT)," Proc. ACM SIGCOMM '88, Aug. 1988.

T. Dierts, "The transport layer security (TLS) protocol version 1.2," IETF RFC 5246, 2008.

T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.

The Despotify Project (2012). Available online at http://despotify.sourceforge.net/.

V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.

V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.

V. K. Adhikari, S. Jain, Y. Chen, and Z.-L. Zhang. Vivisecting Youtube:An Active Measurement Study. In INFOCOM12 Mini-conference (2012).

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012 (2012).

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al.,"DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

D. Trossen and G. Parisis, "Designing and realizing and information-centric Internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

(56) References Cited

OTHER PUBLICATIONS

Gasti, Paolo et al., 'DoS & DDoS in Named Data Networking', 2013 22nd International Conference on Computer Communications and Networks (ICCCN), Aug. 2013, pp. 1-7.
Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.
J. Hur and D.K. Noh, "Attribute-based access control with efficient revocation in data outsourcing sysyters," IEEE Trans. Parallel Distrib. Syst, vol. 22, No. 7, pp. 1214-1221, Jul. 2011.
J. Lotspiech, S. Nusser, and F. Pestoni. Anonymous Trust: Digital Rights Management using Broadcast Encryption. Proceedings of the IEEE 92.6 (2004).
Kaya et al., "A Low Power Lookup Technique for Multi-Hashing Network Applications", 2006 IEEE Computer Society Annual Symposium on Emerging VLSI Technologies and Architectures, Mar. 2006.
S. Kamara and K. Lauter. Cryptographic Cloud Storage. Financial Cryptography and Data Security. Springer Berlin Heidelberg (2010).
RTMP (2009). Available online at http://wwwimages.adobe.com/www.adobe.com/content/dam/Adobe/en/devnet/rtmp/ pdf/rtmp specification 1.0.pdf.
Hoque et al., "NLSR: Named-data Link State Routing Protocol", Aug. 12, 2013, ICN'13.
Nadeem Javaid, "Analysis and design of quality link metrics for routing protocols in Wireless Networks", PhD Thesis Defense, Dec. 15, 2010, Universete Paris-Est.
Wetherall, David, "Active Network vision and reality: Lessons form a capsule-based system", ACM Symposium on Operating Systems Principles, Dec. 1, 1999. pp. 64-79.
Kulkarni A.B. et al., "Implementation of a prototype active network", IEEE, Open Architectures and Network Programming, Apr. 3, 1998, pp. 130-142.
Xie et al. "Collaborative Forwarding and Caching in Content Centric Networks", Networking 2012.
Lui et al. (A TLV-Structured Data Naming Scheme for Content-Oriented Networking, pp. 5822-5827, International Workshop on the Network of the Future, Communications (ICC), 2012 IEEE International Conference on Jun. 10-15, 2012).
Peter Dely et al. "OpenFlow for Wireless Mesh Networks" Computer Communications and Networks, 2011 Proceedings of 20th International Conference on, IEEE, Jul. 31, 2011 (Jul. 31, 2011), pp. 1-6.
Garnepudi Parimala et al "Proactive, reactive and hybrid multicast routing protocols for Wireless Mesh Networks", 2013 IEEE International Conference on Computational Intelligence and Computing Research, IEEE, Dec. 26, 2013, pp. 1-7.
Tiancheng Zhuang et al. "Managing Ad Hoc Networks of Smartphones", International Journal of Information and Education Technology, Oct. 1, 2013.
Amadeo et al. "Design and Analysis of a Transport-Level Solution for Content—Centric VANETs", University "Mediterranea" of Reggio Calabria, Jun. 15, 2013.
Marc Mosko: "CCNx 1.0 Protocol Introduction" Apr. 2, 2014 [Retrieved from the Internet Jun. 8, 2016] http://www.ccnx.org/pubs/hhg/1.1%20CCNx%201.0%20Protocol%20Introduction.pdf *paragraphs [01.3], [002], [02.1], [0003].
Akash Baid et al: "Comparing alternative approaches for networking of named objects in the future Internet", Computer Communications Workshops (Infocom Wkshps), 2012 IEEE Conference on, IEEE, Mar. 25, 2012, pp. 298-303, *Paragraph [002]* *figure 1*.
Priya Mahadevan: "CCNx 1.0 Tutorial", Mar. 16, 2014, pp. 1-11, Retrieved from the Internet: http://www.ccnx.org/pubs/hhg/1.2 %20CCNx%201.0%20Tutorial.pdf [retrieved on Jun. 8, 2016] *paragraphs [003]-[006], [0011], [0013]*figures 1,2*.
Marc Mosko et al "All-In-One Streams for Content Centric Networks", May 24, 2015, retrieved from the Internet: http://www.ccnx.org/pubs/AllinOne.pdf [downloaded Jun. 9, 2016] *the whole document*.
Cesar Ghali et al. "Elements of Trust in Named-Data Networking", Feb. 13, 2014 Retrieved from the internet Jun. 17, 2016 http://arxiv.org/pdf/1402.3332v5.pdf *p. 5, col. 1* *p. 2, col. 1-2* *Section 4.1; p. 4, col. 2* *Section 4.2; p. 4, col. 2*.
Priya Mahadevan et al. "CCN-KRS", Proceedings of the 1st International Conference on Information-Centric Networking, Inc. '14, Sep. 24, 2014.
Flavio Roberto Santos et al. "Funnel: Choking Polluters in BitTorrent File Sharing Communities", IEEE Transactions on Network and Service Management, IEEE vol. 8, No. 4, Dec. 1, 2011.
Liu Wai-Xi et al: "Multisource Dissemination in content-centric networking", 2013 Fourth International conference on the network of the future (NOF), IEEE, Oct. 23, 2013, pp. 1-5.
Marie-Jose Montpetit et al.: "Network coding meets information-centric networking", Proceedings of the 1st ACM workshop on emerging Name-Oriented mobile networking design, architecture, algorithms, and applications, NOM '12, Jun. 11, 2012, pp. 31-36.
Asokan et al.: "Server-Supported Signatures", Computer Security Esorics 96, Sep. 25, 1996, pp. 131-143, Section 3.
Mandl et al.: "A Fast FPGA Based Coprocessor Supporting Hard Real-Time Search", New Frontiers of Information Technology, Proceedings of the 23rd Euromicro Conference Budapest, Sep. 1, 1997, pp. 499-506 *the Whole Document*.
Sun et al.: "Content-Based Route Lookup Using CAMs", Global Communications Conference, IEEE, Dec. 3, 2012 *The Whole Document*.

* cited by examiner

SYSTEM AND METHOD FOR ALL-IN-ONE CONTENT STREAM IN CONTENT-CENTRIC NETWORKS

RELATED APPLICATIONS

The subject matter of this application is related to the subject matter in the following application:
U.S. patent application Ser. No. 14/334,386, entitled "RECONSTRUCTABLE CONTENT OBJECTS," by inventor Marc Mosko, filed 17 Jul. 2014 the disclosures of which are herein incorporated by reference in their entirety.

BACKGROUND

Field

The present disclosure relates generally to a content-centric network (CCN). More specifically, the present disclosure relates to a system and method for downloading a set of Content Objects using a single named stream in content-centric networks (CCNs).

Related Art

The proliferation of the Internet and e-commerce continues to fuel revolutionary changes in the network industry. Today, a significant number of information exchanges, from online movie viewing to daily news delivery, retail sales, and instant messaging, are conducted online. An increasing number of Internet applications are also becoming mobile. However, the current Internet operates on a largely location-based addressing scheme. The two most ubiquitous protocols, Internet Protocol (IP) and Ethernet protocol, are both based on end-host addresses. That is, a consumer of content can only receive the content by explicitly requesting the content from an address (e.g., IP address or Ethernet media access control (MAC) address) that is typically associated with a physical object or location. This restrictive addressing scheme is becoming progressively more inadequate for meeting the ever-changing network demands.

Recently, information-centric network (ICN) architectures have been proposed in the industry where content is directly named and addressed. Content-Centric networking (CCN), an exemplary ICN architecture brings a new approach to content transport. Instead of viewing network traffic at the application level as end-to-end conversations over which content travels, content is requested or returned based on its unique name, and the network is responsible for routing content from the provider to the consumer. Note that content includes data that can be transported in the communication system, including any form of data such as text, images, video, and/or audio. A consumer and a provider can be a person at a computer or an automated process inside or outside the CCN. A piece of content can refer to the entire content or a respective portion of the content. For example, a newspaper article might be represented by multiple pieces of content embodied as data packets. A piece of content can also be associated with metadata describing or augmenting the piece of content with information such as authentication data, creation date, content owner, etc.

In CCN, names play an important role. More specifically, Content Objects and Interests are identified by their name, which is typically a hierarchically structured variable-length identifier (HSVLI). Interests and Content Objects flow through the network based on their names. When downloading named content, which can be a file library or a web page, the requester often needs to issue an initial set of Interest messages to obtain the catalog of the library or the markup document of the web page. In the case of a web page, upon receiving the markup document, the requester needs to parse the markup document, and then start downloading embedded objects referenced by the markup document. Such a process often requires more than one round-trip time (RTT), thus adding significant latency to the content download process. This problem is similar to the download-latency problem experienced by IP networks.

In the IP world, people have not been satisfied with the performance of Hypertext Transfer Protocol (HTTP), because although very efficient at transferring individual files, HTTP cannot efficiently transfer a large number of small files. However, today's web destinations often include pages with tens of, or more, embedded objects, such as images, cascading style sheet (CSS) files, and external JavaScript files. Loading all these individual files takes time because of all the overhead of separately requesting them and waiting for the TCP (Transmission Control Protocol) sessions to probe the network capacity and ramp up their transmission speed. For example, when requesting web content using HTTP over TCP, the requester typically has to wait for a three-way TCP handshake to be completed to send a GET request before beginning to download the desired HTTP and HTML markup document. Then, after parsing the markup document, the requester can request the individual embedded objects. To reduce such download latency, certain "zero round-trip time" protocols have been developed in the IP setting, such as SPTY™ (registered trademark of Google Inc. of Menlo Park, Calif.) developed by Google. However, no such solutions exist in CCN settings.

SUMMARY

One embodiment of the present invention provides a system for assembling a single content stream that enables downloading of a content collection using the single content stream over a network. During operation, the system obtains the content collection that includes a plurality of content components, and generates a manifest for the content collection. A respective entry in the manifest corresponds to a content component. The system assembles the single content stream by including the manifest followed by the plurality of content components. The manifest and the content components are packaged into objects under a same namespace, thereby facilitating a requester requesting one or more content components within the content collection using interests under the same namespace.

In a variation on this embodiment, the content component spans over multiple chunks within the single content stream with each chunk corresponding to a packaged object and being assigned a sequence number. The entry in the manifest specifies sequence numbers of the multiple chunks.

In a variation on this embodiment, the entry in the manifest further specifies hash values of one or more of the multiple chunks of the content component, thereby enabling the requester to determine whether a copy of the content component exists in the requester's local cache by checking the hash values.

In a variation on this embodiment, the system further receives, from the requester, a set of Interests under the same namespace; and determines, from the plurality of content components, which content component to be included in the single content stream.

In a variation on this embodiment, the network is a content-centric network, and the objects are standard CCN Content Objects.

In a further variation, at least one Content Object in the single content stream includes key information, and a respective Content Object includes a cryptographic signature associated with the key.

In a variation on this embodiment, a content component includes a second single content stream, and the second single content stream includes a second manifest.

In a variation on this embodiment, the manifest includes multiple segments, and the multiple segments of the manifest are scattered at different locations within the single content stream.

In a variation on this embodiment, assembling the single content stream further comprises placing the plurality of content components in order.

In a further variation, placing the plurality of content components in order involves one or more of: placing one or more content components that are required for rendering the content collection at beginning of the single content stream, and placing the plurality of content components in order based on their modification times.

BRIEF DESCRIPTION OF THE FIGURES

In the figures, like reference numerals refer to the same figure elements.

DETAILED DESCRIPTION

Overview

Figure 1:
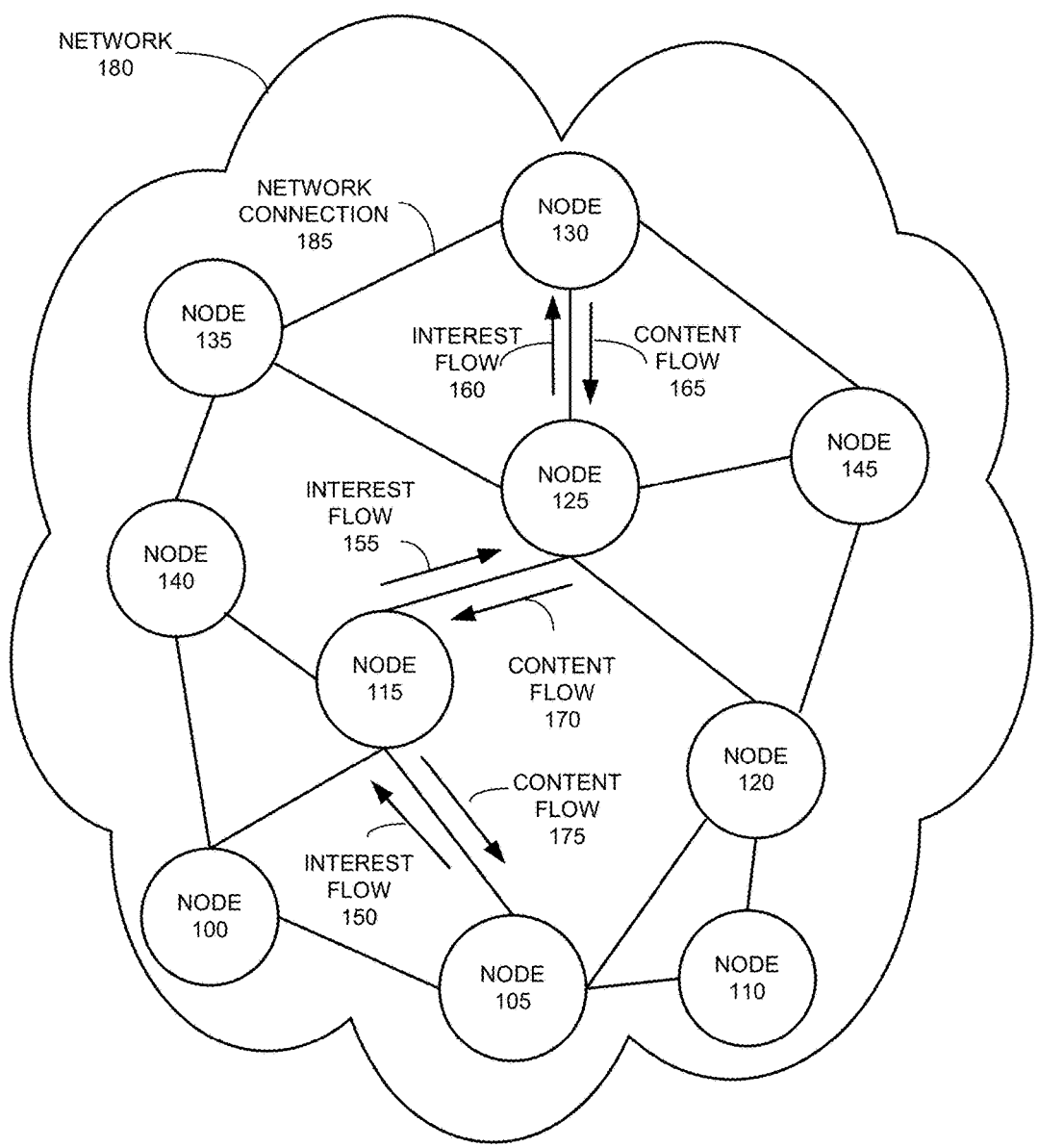
FIG. 1 illustrates an exemplary architecture of a network, in accordance with an embodiment of the present invention.

Embodiments of the present invention provide a system and method for downloading a set of Content Objects using a single named stream without incurring a round-trip time for downloading the content manifest. More specifically, the system aggregates all necessary content (such as all content in a webpage) into a single named stream, known as an all-in-one stream. The all-in-one stream includes a specially constructed manifest (known as the all-in-one manifest) followed by constituent objects. The all-in-one manifest includes a set of entries, with each entry corresponding to a content component (which may span multiple Content Objects or Content Object fragments when fragmentation is enabled). An entry in the all-in-one manifest specifies the CCN base name of the content component (which can be an embedded object in a webpage or the markup document of the webpage), the list of chunk numbers occupied the content component, and the Content Object hash of each chunk (Content Object) within the content component. The entire all-in-one stream is under one chunked namespace, with all chunks having the same name prefix, so a requester of the content can open up one large Interest window to download the all-in-one manifest and all locally served content components. The all-in-one manifest has enough information such that the requester could skip specific not-yet downloaded content components if it already has them.

In general, CCN uses two types of messages: Interests and Content Objects. An Interest carries the hierarchically structured variable-length identifier (HSVLI), also called the "name" or the "CCN name" of a Content Object and serves as a request for that object. If a network element (e.g., router) receives multiple Interests for the same name, it may aggregate those Interests. A network element along the path of the Interest with a matching Content Object may cache and return that object, satisfying the Interest. The Content Object follows the reverse path of the Interest to the origin(s) of the Interest. A Content Object contains, among other information, the same HSVLI, the object's payload, and cryptographic information used to bind the HSVLI to the payload.

The terms used in the present disclosure are generally defined as follows (but their interpretation is not limited to such):

"HSVLI:" Hierarchically structured variable-length identifier, also called a Name. It is an ordered list of Name Components, which may be variable length octet strings. In human-readable form, it can be represented in a format such as ccnx:/path/part. Also the HSVLI may not be human-readable. As mentioned above, HSVLIs refer to content, and it is desirable that they be able to represent organizational structures for content and be at least partially meaningful to humans. An individual component of an HSVLI may have an arbitrary length. Furthermore, HSVLIs can have explicitly delimited components, can include any sequence of bytes, and are not limited to human-readable characters. A longest-prefix-match lookup is important in forwarding packets with HSVLIs. For example, an HSVLI indicating an Interest in "/parc/home/bob" will match both "/parc/home/bob/test.txt" and "/parc/home/bob/bar.txt." The longest match, in terms of the number of name components, is considered the best because it is the most specific. Detailed descriptions of the HSVLIs can be found in U.S. Pat. No. 8,160,069, entitled "SYSTEM FOR FORWARDING A PACKET WITH A HIERARCHICALLY STRUCTURED VARIABLE-LENGTH IDENTIFIER," by inventors Van L. Jacobson and James D. Thornton, filed 23 Sep. 2009, the disclosure of which is incorporated herein by reference in its entirety.

"Interest:" A request for a Content Object. The Interest specifies an HSVLI name prefix and other optional selectors that can be used to choose among multiple objects with the same name prefix. Any Content Object whose name matches the Interest name prefix (and, optionally, other requested parameters such as publisher key-ID match) satisfies the Interest.

"Content Object:" A data object sent in response to an Interest. It has an HSVLI name and a Content payload that are bound together via a cryptographic signature. Optionally, all Content Objects have an implicit terminal name component made up of the SHA-256 digest of the Content Object. In one embodiment, the implicit digest is not transferred on the wire, but is computed at each hop, if needed. Note that the Content Object is not the same as a content component. A Content Object has a specifically defined structure under CCN protocol and its size is normally the size of a network packet (around 1500 bytes for wide area networks and 8000 bytes for local area networks and with fragmentation), whereas a content component is a general term used to refer to a file of any type, which can be an embedded object of a webpage. For example, a webpage may include a number of embedded objects, such as images, video files, or interactive components. Each embedded object is a content component and may span multiple Content Objects.

As mentioned before, an HSVLI indicates a piece of content, is hierarchically structured, and includes contiguous components ordered from a most general level to a most specific level. The length of a respective HSVLI is not fixed. In content-centric networks, unlike a conventional IP network, a packet may be identified by an HSVLI. For example, "abcd/bob/papers/ccn/news" could be the name of the content and identifies the corresponding packet(s), i.e., the "news" article from the "ccn" collection of papers for a user named "Bob" at the organization named "ABCD." To request a piece of content, a node expresses (e.g., broadcasts) an Interest in that content by the content's name. An Interest in a piece of content can be a query for the content according to the content's name or identifier. The content, if available in the network, is sent back from any node that stores the content to the requesting node. The routing infrastructure intelligently propagates the Interest to the prospective nodes that are likely to have the information and then carries available content back along the reverse path traversed by the Interest message. Essentially the Content Object follows the breadcrumbs left by the Interest message and thus reaches the requesting node.

FIG. 1 illustrates an exemplary architecture of a network, in accordance with an embodiment of the present invention. In this example, a network 180 comprises nodes 100-145. Each node in the network is coupled to one or more other nodes. Network connection 185 is an example of such a connection. The network connection is shown as a solid line, but each line could also represent sub-networks or super-networks, which can couple one node to another node. Network 180 can be content-centric, a local network, a super-network, or a sub-network. Each of these networks can be interconnected so that a node in one network can reach a node in other networks. The network connection can be broadband, wireless, telephonic, satellite, or any type of network connection. A node can be a computer system, an endpoint representing users, and/or a device that can generate Interest or originate content.

In accordance with an embodiment of the present invention, a consumer can generate an Interest for a piece of content and forward that Interest to a node in network 180. The piece of content can be stored at a node in network 180 by a publisher or content provider, who can be located inside or outside the network. For example, in FIG. 1, the Interest in a piece of content originates at node 105. If the content is not available at the node, the Interest flows to one or more nodes coupled to the first node. For example, in FIG. 1, the Interest flows (Interest flow 150) to node 115, which does not have the content available. Next, the Interest flows (Interest flow 155) from node 115 to node 125, which again does not have the content. The Interest then flows (Interest flow 160) to node 130, which does have the content available. The flow of the Content Object then retraces its path in reverse (content flows 165, 170, and 175) until it reaches node 105, where the content is delivered. Other processes such as authentication can be involved in the flow of content.

In network 180, any number of intermediate nodes (nodes 100-145) in the path between a content holder (node 130) and the Interest generation node (node 105) can participate in caching local copies of the content as it travels across the network. Caching reduces the network load for a second subscriber located in proximity to other subscribers by implicitly sharing access to the locally cached content.

The Manifest

In CCN, a manifest (also known as a catalog) is used to represent a collection of data. For example, a CCN node may contain a video collection that includes a large number of video files, and the manifest of the video collection can be an ordered list identifying the Content Objects corresponding to the video files. Note that, due to the size limit of a Content Object, a video file may span multiple Content Objects. Moreover, a CCN node may store content for a webpage, and the manifest for the web page identifies the different components of the webpage, such as the markup document and embedded objects (including Java scripts, image files, audio files, video files, etc.).

Figure 2:
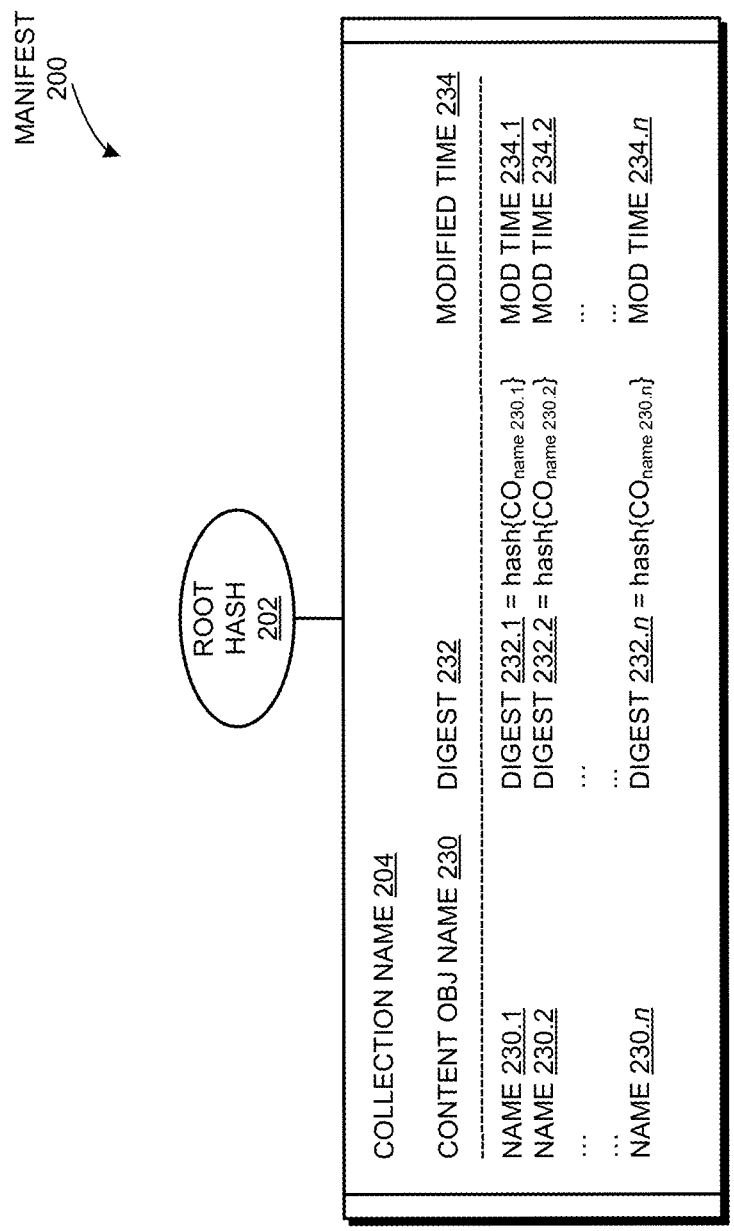
FIG. 2 presents a diagram illustrating the format of a conventional manifest.

In the manifest, each Content Object is identified by its name and corresponding digest, where the digest is the hash value (often computed using a cryptographic hash function, such as hash function SHA-256) of the Content Object. In some embodiments, each Content Object is also identified by a modified time indicating the time that the content was modified. FIG. 2 presents a diagram illustrating the format of a conventional manifest (prior art).

In FIG. 2, manifest 200 includes an ordered list of Content Objects identified by a collection name 204 and one or more of the following: a Content Object name 230.1-230.*n*; a digest 232.1-232.*n*; and a modified time 234.1-234.*n*. The digests 232.1-232.*n* include a hash value of the Content Object identified respectively by names 230.1-230.*n*. Manifest 200 also includes a root hash 202, which is an additive hash value based on the hash values 232.1-232.*n* of the individual Content Objects in the collection. Root hash 202 of manifest 200 is a unique identifier for manifest 200.

As shown in FIG. 2, manifest 200 can indicate a name and corresponding digest for each Content Object represented in the collection. Optionally, manifest 200 can also include a modified time for each Content Object represented in the collection. The use of the modified time field depends on the underlying application or service being performed. In addition to an ordered list, the manifest may also be structured as a synchronization tree, which contains content objects as well as nested collections of content objects.

Figure 3A:
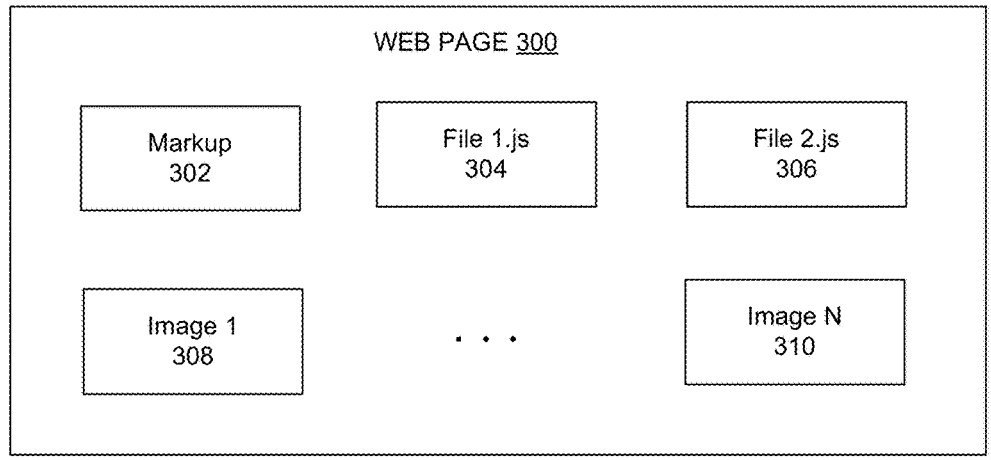
FIG. 3A presents a diagram illustrating the various components included in a webpage.

In conventional CCNs, when a content requester requests a content collection, such as a web page, the requester needs to issue an initial set of Interest messages to read a piece of the content. FIG. 3A presents a diagram illustrating the various components included in a web page. In FIG. 3A, a web page 300 includes a markup document 302 and a number of objects referenced by markup document 302, such as JavaScript files 304 (File1.js) and 306 (File2.js) and embedded images 308 (image 1) and 310 (image N). In order to download entire web page 300, a requester first needs to request markup document 302, and then it needs to parse markup document 302 to get information about the embedded objects in order to request those objects, such as JavaScript files 304 and 306 or images 308 and 310.

Figure 3B:
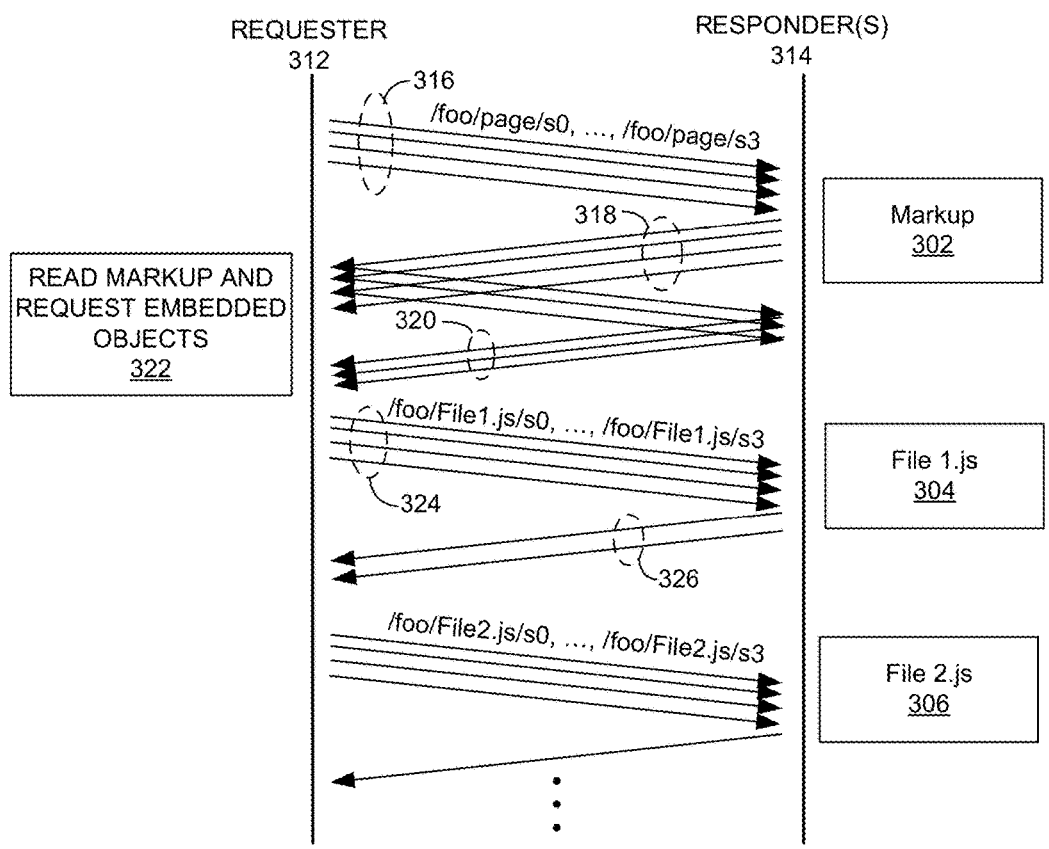
FIG. 3B presents a diagram illustrating a conventional process of downloading a webpage with embedded objects.

FIG. 3B presents a diagram illustrating a conventional process of downloading a web page with embedded objects. In FIG. 3B, a requester 312 is downloading a web page that includes multiple embedded objects from one or more responders 314. During operation, requester 312 starts the downloading process by issuing a set of Interest messages 316 to responder 314 to request the markup document. Upon retrieving the markup document, requester 312 parses the markup document, and then requests the embedded objects (which can be a JavaScript file or an image) one by one. This results in the staggered requesting and downloading of the embedded objects, thus increasing latency. Moreover, because requester 312 does not know a priori how many chunks to request for an embedded object, it may send an estimated number of Interests to request the object, which may be too few or too many. For example, in FIG. 3B, Interest set 316 for the markup document includes four Interests, each with the same name prefix but different chunk numbers (such as /foo/page/s0, /foo/page/s1, . . . , /foo/page/s3). However, the number of issued Interests is less than the number of segments (chunks) included in markup document 302. Upon receiving the initial segments, requester 312 issues additional Interests for the rest of markup document 302. Upon receiving all segments (including a Content Object set 318 and a Content Object set 320) of markup document 302, requester 312 reads the markup document and requests the embedded objects (operation 322).

To request JavaScript file 304 (File1.js), requester 312 sends a set of Interest messages 324. Without a priori knowledge of the size of File1.js, requester 312 may open too large a window by issuing too many Interests. In FIG. 3B, requester 312 issues four Interests for File1.js, each with the same name prefix but different chunk numbers (such as /foo/File1.js/s0, /foo/File1.js/s1, . . . , /foo/File1.js/s3). However, File1.js contains only two segments, and returns a Content Object set 326 that includes only two Content Objects. Therefore, the extra two Interests sent from requester 312 for File1.js are wasted, and could have been used to request useful content, such as being used to start downloading JavaScript file 306 (File2.js). Similarly, requester 312 may again issue four Interests for JavaScript file 306 (File2.js), which has only one segment, meaning that three Interests are wasted. For content collections that include many small objects, this over-requesting can significantly reduce the overall throughput of the network.

In order to reduce the download latency and to improve throughput, in some embodiments, the system aggregates all the necessary content (including the markup document and all embedded objects) into a single named stream, and allows a requester to download all the necessary content using the single named stream, also known as an all-in-one stream. In some embodiments, this single named stream (the all-in-one stream) for a content collection includes an all-in-one manifest followed by the embedded objects. Note that, in order to facilitate downloading with the all-in-one stream, changes need to be made to a conventional manifest (as shown in FIG. 2) to obtain an all-in-one manifest. More specifically, the all-in-one manifest needs to specify the number of segments contained in each embedded object.

Figure 4:
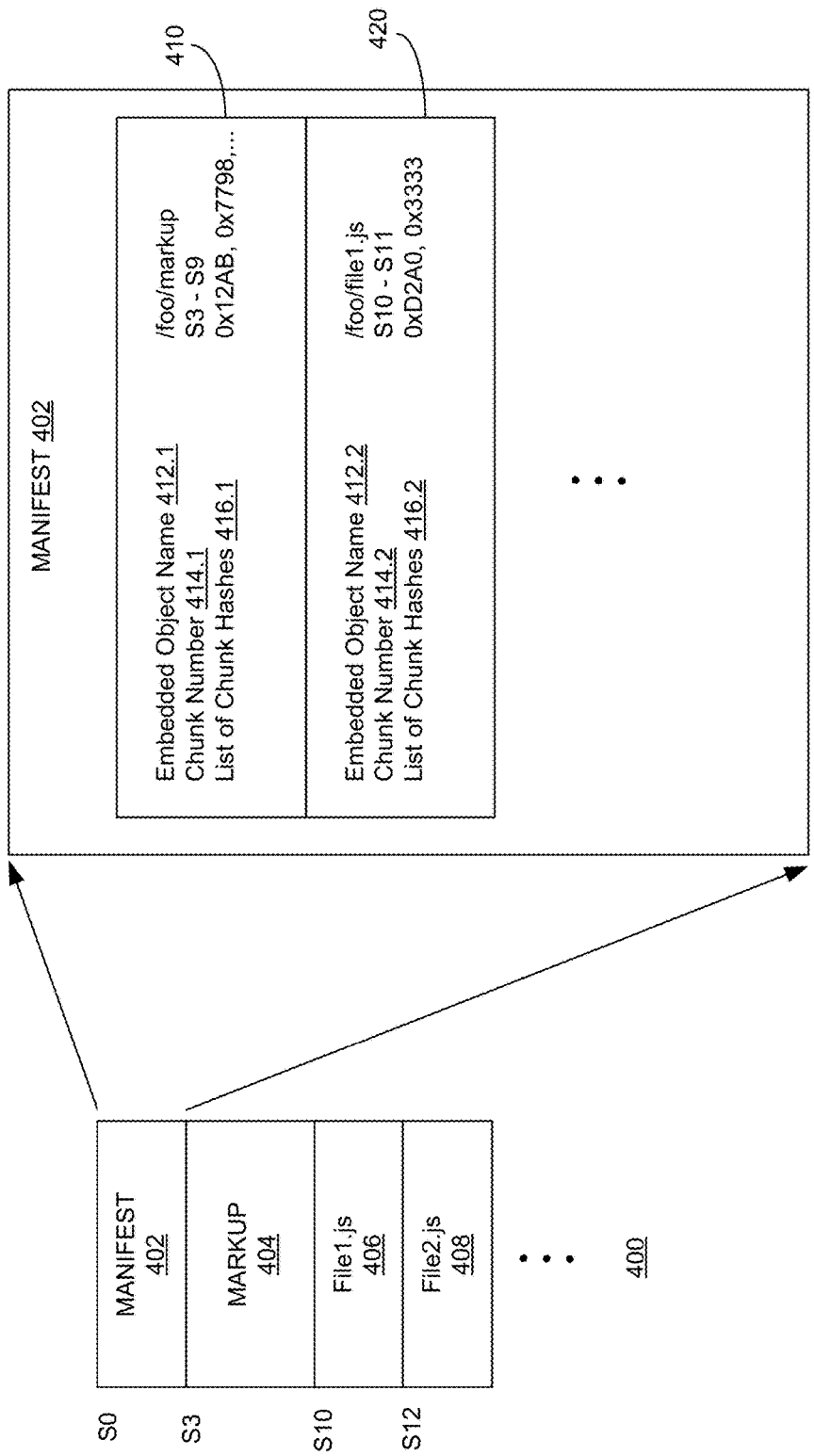
FIG. 4 presents a diagram illustrating the format of an exemplary all-in-one manifest, in accordance with an embodiment of the present invention.

FIG. 4 presents a diagram illustrating the format of an exemplary all-in-one manifest, in accordance with an embodiment of the present invention. In FIG. 4, a content collection (which can include all content of a web page) 400 includes a manifest 402, a markup document 404, a JavaScript file (File1.js) 406, a JavaScript file (File2.ls) 408, and other components. Manifest 402 includes an ordered list of content components, with each entry corresponding to one content component, which can be a markup document or an embedded object. Each entry includes an object name field that specifies the CCN name of the content component, a chunk-number field that lists the sequence of the chunks of the content component within the all-in-one stream, and a chunk-hash field that lists the hash values of all the chunks.

For example, in FIG. 4, entry 410 included in manifest 402 corresponds to markup document 404. More specifically, entry 410 includes an object name field 412.1, a chunk-number field 414.1, and a chunk-hash field 416.1. Object name field 412.1 specifies the CCN base name (/foo/markup) of markup document 404. Chunk-number field 414.1 specifies that markup document 404 (identified by the CCN name 412.1) occupies chunks s3-s9 (seven chunks in total with each chunk being an individual Content Object) of the all-in-one stream. Note that, in some embodiments, the CCN name of each chunk (or each Content Object) can be constructed as the CCN base name of the content component plus the chunk number. For example, the first chunk of markup document 404 can have a CCN name/foo/markup/s0, and the last chunk can have a CCN name/foo/markup/s6, given that markup document 404 has seven chunks. Chunk-hash field 416.1 lists the Content Object hash values (such as 0x12AB, 0x7798, etc.) of all seven chunks. Note that in the example shown in FIG. 4, the Content Object hash values are shown as 2-byte hashes for viewing simplicity. In practice, the Content Object hash of a Content Object can be a 16-byte hash value calculated using a SHA-256 function or another strong hash function.

Also shown in FIG. 4, entry 420 included in manifest 402 corresponds to JavaScript file 406 (File1.js). Similar to entry 410, entry 420 includes an object name field 412.2, a chunk-number field 414.2, and a chunk-hash field 416.2. More specifically, object name field 412.2 specifies that the CCN name for JavaScript file 406 is /foo/file1.js, chunk-number field 414.2 specifies that JavaScript file 406 has two chunks (s10 and s11), and chunk-hash field 416.2 lists the Content Object hash values for those two chunks (0xD2A0, 0x3333).

Note that unlike conventional manifests, manifest 402 enumerates the chunk ranges (or offset) of each embedded object in the all-in-one stream. This allows the requester of the content to determine whether the object (content component) is already covered by the outstanding Interest window. For example, if 10 Interests have been issued, then the $10^{th}$ chunk has been covered by the issued Interests. In addition, including the Content Object hash of each chunk in the manifest 402 allows the requester to determine whether it already has an object or a segment of the object in its cache by comparing the Content Object hash values. If an object is not yet covered by an outstanding request and the requestor already has the object in its cache, the requester can skip the download of that embedded object. For example, embedded JavaScript file 406 ranges from s10 to s11 in the all-in-one stream, and if an initial request issues Interests up to chunk 9, then JavaScript file 406 is not covered by the initial request. In addition, based on the Content Object hashes of JavaScript file 406, the requester may determine that it already has JavaScript file 406 in its cache. Hence, the requester can then skip the download of JavaScript file 406 while continuing to download subsequent content components within content collection 400.

Moreover, listing the Content Object hashes of each content component allows a requester to open up separate Interest windows for each individual content component and request them by their hashes. More specifically, the requester can request a particular embedded object under its own name, using a self-certified Content Object hash name. For example, the requester may request JavaScript file 406 by the hashes of its two segments, 0xD2A0 and 0x3333. In other words, in addition to enabling content download using a single all-in-one stream, the all-in-one manifest also enables a requester to download content components using a set of parallel streams that are independent of each other. Hence, instead of waiting to parse the markup document before downloading the embedded objects, the requester can download the markup document and the embedded documents in parallel. Each stream request can be based on the hash name of the embedded object. Downloading an embedded object using its own hash name also allows the download to come from some well-positioned caches, whereas downloading the embedded objects along with the markup document may result in their coming from a less optimal source. For example, image files may have very long cache lifetimes, so they can be cached in many places, while the frequently updated web page (the markup) might have a short cache lifetime and is cached in few locations. In such situations, it is desirable to download the images from a nearby cache location, instead of downloading them from the same location of the markup document, which can be far away.

The all-in-One Stream

Figure 5:
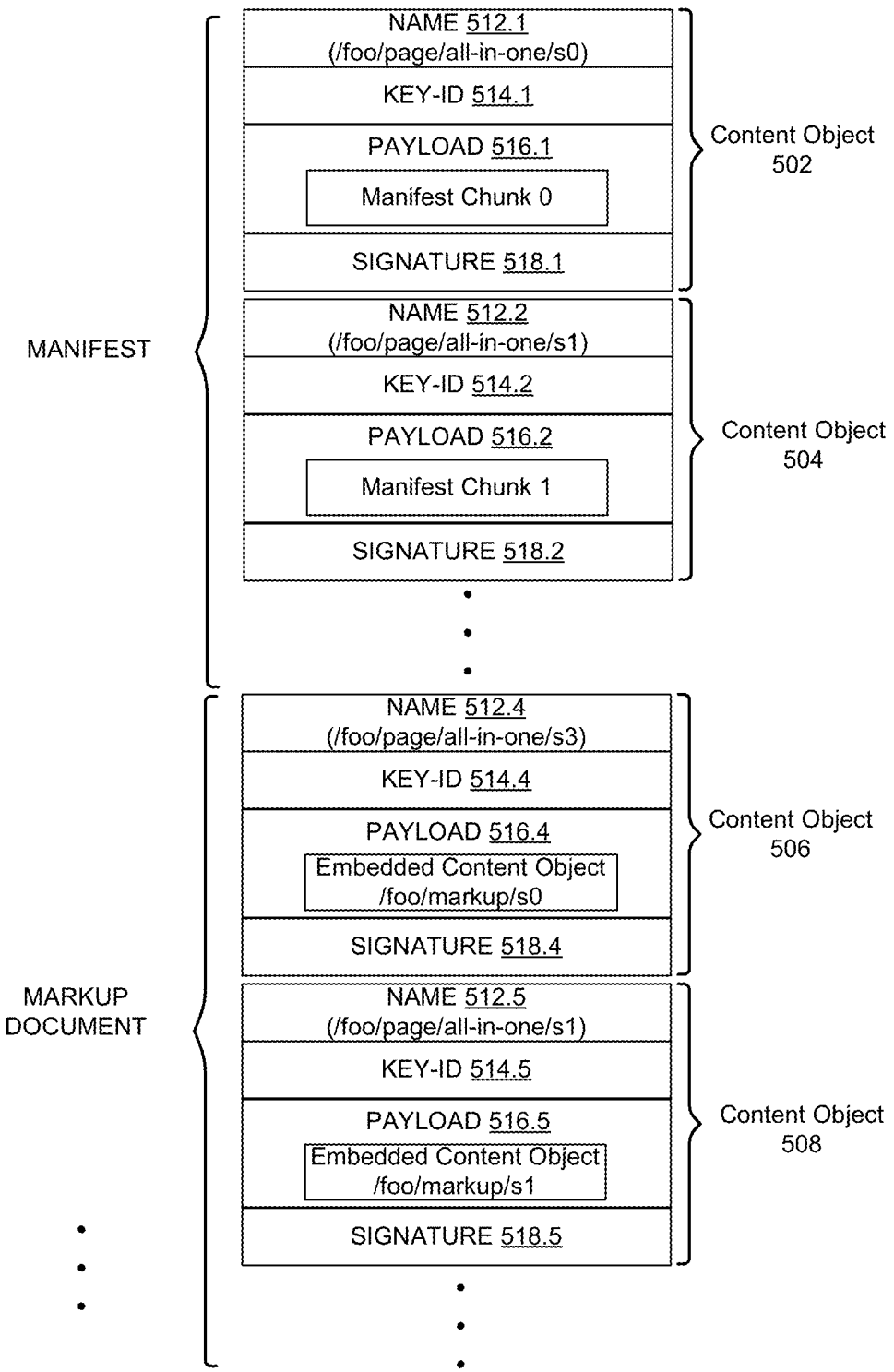
FIG. 5 presents a diagram illustrating the format of exemplary Content Objects in the all-in-one stream, in accordance with an embodiment of the present invention.

FIG. 5 presents a diagram illustrating the format of exemplary Content Objects in the all-in-one stream, in accordance with an embodiment of the present invention. More specifically, FIG. 5 shows how a content collection (such as content collection 400) can be assembled into a single all-in-one stream that includes many chunks under the same namespace, with each chunk being a standard CCN Content Object. In FIG. 5, an all-in-one stream 500 includes a plurality of chunks, such as chunks 502, 504, 506, and 508. Each chunk is a standard CCN Content Object conforming to the standard CCN Content Object format. Each Content Object includes at least a name component 512.$x$, a key-ID component 514.$x$, a payload component 516.$x$, and a signature component 518.$x$, with x corresponding to the sequence number of the chunk.

The name component specifies the CCN name of each chunk/Content Object. In some embodiments, all Content Objects within the all-in-one stream have the same name prefix, and the CCN name of a Content Object is the name prefix plus its chunk number. In the example shown in FIG. 5, the name prefix of all Content Objects in all-in-one stream 500 is /foo/page/all-in-one, and the CCN name for Content Object 502 (which is the first chunk, chunk 0, in all-in-one stream 500) is /foo/page/all-in-one/s0, as indicated by name component 512.1. Similarly, the CCN name for Content Object 504 (which is the second chunk, chunk 1, in all-in-one stream 500) is /foo/page/all-in-one/s1, as shown by name component 512.2.

The key-ID component (514.$x$) within each Content Object identifies the public key used by the publisher to sign the Content Object. The signature component (518.$x$) can be obtained by signing, using the corresponding private key, the remaining portions of the Content Object. In some embodiments, the signature can be obtained by signing over the hash of the remaining portions of the Content Object. For example, one can obtain signature 518.1 by signing a hash value computed over name component 512.1, key-ID component 514.1, and payload component 516.1. Note that, in some embodiments, not all Content Objects within the all-in-one stream contain the key-ID. At a minimum, the first Content Object in the all-in-one stream should include the key-ID, or optionally carry the public key, so that intermediate nodes and end systems can verify signatures.

The payload component (516.$x$) for each Content Object or chunk includes either a portion of the manifest or a portion of an embedded content component, such as the markup document or a JavaScript file. The first few chunks (Content Objects) of the all-in-one stream often are wrapping objects that represent the manifest of the stream, and the payload of these wrapping objects is the manifest itself. Depending on the size of the manifest, the wrapping objects may include fewer or more Content Objects. In the example shown in FIG. 5, the manifest extends over three Content Objects (chunks s0-s2), with each Object containing a chunk of the manifest. For example, payloads 516.1 and 516.2 include the first and second chunks of the manifest, respectively.

The payloads of subsequent Content Objects include portions of the content components. For example, the payloads of Content Objects 506 and 508 include embedded Content Objects /foo/markup/s0 and /foo/markup/s1, which are the first and second chunks of the markup document. Note that, although each embedded content component chunk itself may be a CCN Content Object that has its own name (such as /foo/markup/s0 in the case of the chunk being part of the markup document), the corresponding Content Object assembled in the all-in-one stream is assigned its own stream name, as indicated by name component 512.$x$. All Content Objects within the same all-in-one stream are assigned the same name prefix. Note that assigning the same name prefix to all Content Objects in the all-in-one stream allows a requester to open a large-enough window to download all embedded content components continuously without the need to parse the markup document. For example, the requester can construct an initial set of Interests by sequentially adding the chunk number to the name prefix, and using the initial set of Interests to request the embedded content components without needing to know the numbers, names, or sizes of those embedded content components within a content collection. For example, a requester can issue a set of Interests (/foo/page/all-in-one/s0, /foo/page/all-in-one/s1, . . . , /foo/page/all-in-one/s19) to request the first 20 chunks of the all-in-one stream. Note that while downloading the chunks, the requester can read the manifest (which is usually downloaded first) to determine whether it needs to issue more Interests and whether it can skip the download of certain components because it already has them in its cache.

Figure 6:
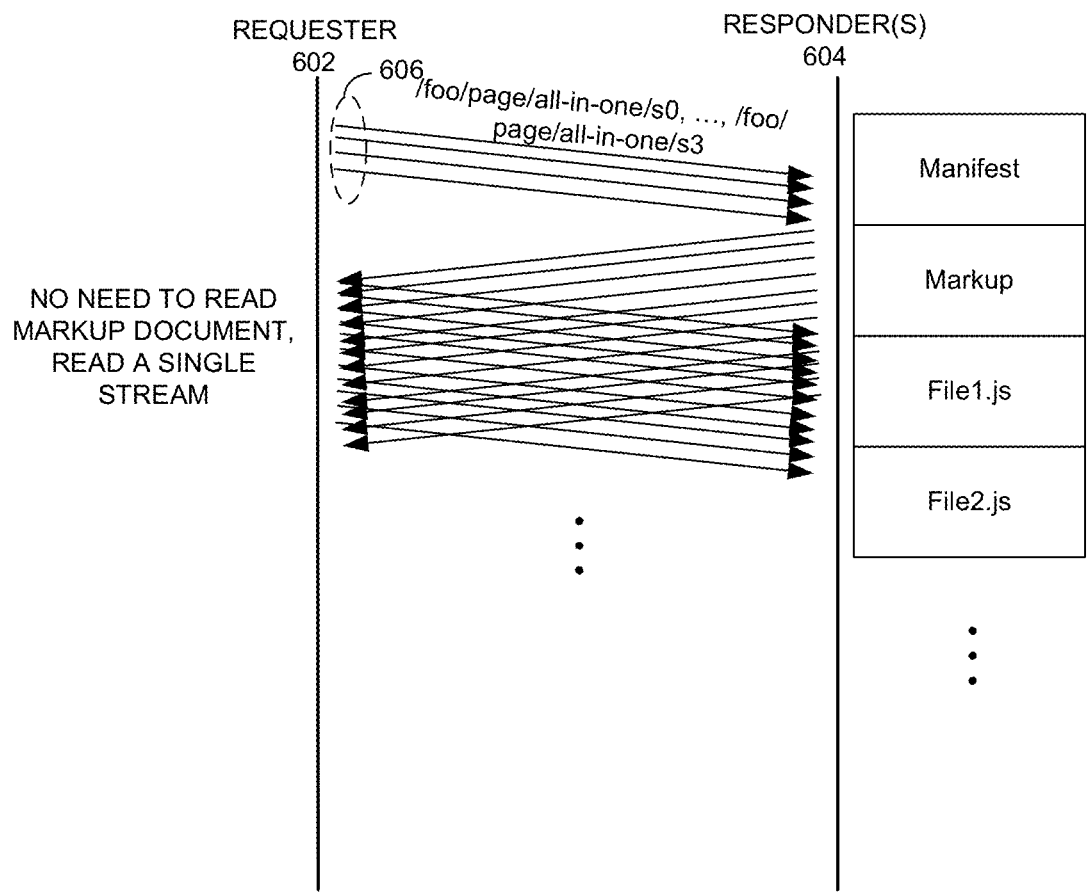
FIG. 6 presents a diagram illustrating an exemplary process of downloading a content collection using an all-in-one stream, in accordance with an embodiment of the present invention.

FIG. 6 presents a diagram illustrating an exemplary process of downloading a content collection using an all-in-one stream, in accordance with an embodiment of the present invention. In FIG. 6, a requester 602 is downloading a web page that includes multiple embedded objects from one or more responders 604. To enable the all-in-one download, an all-in-one manifest has been created as a wrapper for the content of the web page.

During operation, requester 602 starts the downloading process by issuing an initial set of Interest messages 606 to responder 604. The number of Interests included in initial set of Interest messages 606 can be arbitrary. In some embodiments, this initial window (as defined by initial Interest set 606) can be sufficiently large to cover all wrapper objects, i.e., the manifest, but not larger than the entire content collection. In the example shown in FIG. 6, initial Interest set 606 includes four Interests (/foo/page/all-in-one/s0 to /foo/page/all-in-one/s3), creating a download window large enough for the retrieval of the manifest. Note that requester 602 can continue to issue new Interests (while reading the manifest) to request other content components, such as the markup document and the JavaScript files, using the same name prefix (/foo/page/all-in-one). The new Interests can be created by sequentially adding the chunk numbers. In some embodiments, while downloading, requester 602 reads the manifest, determines the total number of chunks included in the content collection, and issues a suitable number of Interests accordingly. For example, from reading the manifest, requester 602 may determine that there are 20 total chunks in the all-in-one stream, and ensure that it issues 20 Interests in total.

In addition, the requester can determine whether it already has one or more content components or chunks in its cache based on the Content Object hashes listed in the manifest, and if so, skip the download of these chunks. For example, by comparing the Content Object hashes, the requester may find that it already has JavaScript file File1.js, which occupies chunks s10 and s11 in the all-in-one stream. To improve the download efficiency, the requester can issue an Interest set that excludes Interests foo/page/all-in-one/s10 and /foo/page/all-in-one/s11. By doing so, the requester provides parameters to the responder so that the responder can configure which embedded objects to be included in the download stream. In this example, because the Interest set does not have Interests for chunks s10 and s11, these two chunks are excluded from the download stream.

In some embodiments, a responder may understand that the content stream will be rendered on a display, such as a webpage being displayed on a monitor or a movie being played, and then the responder can order the content components in the all-in-one stream to optimize the rendering. For example, to display a web page a browser needs the html file before all the images. Consequently, it is best for the responder to place the html file at the beginning of the all-in-one stream such that the browser can begin rendering the screen while transferring the images. If the content is a movie, the responder should place more important frames in front of less important frames in the all-in-one stream. In another example, if one or more content components are encrypted, the responder can place an item that describes the encryption before the encrypted content components.

Comparing FIG. 6 to FIG. 3, one can see that there is no longer a need to stagger the download of the multiple embedded content components. Instead, in embodiments of the present invention, the download of the content collection can be accomplished using a single stream, thus potentially significantly reducing the download latency. Moreover, because the manifest lists the total number of chunks included in the download stream, there is no need for the requester to over-request, and no Interests will be wasted, thus increasing the system throughput.

Figure 7:
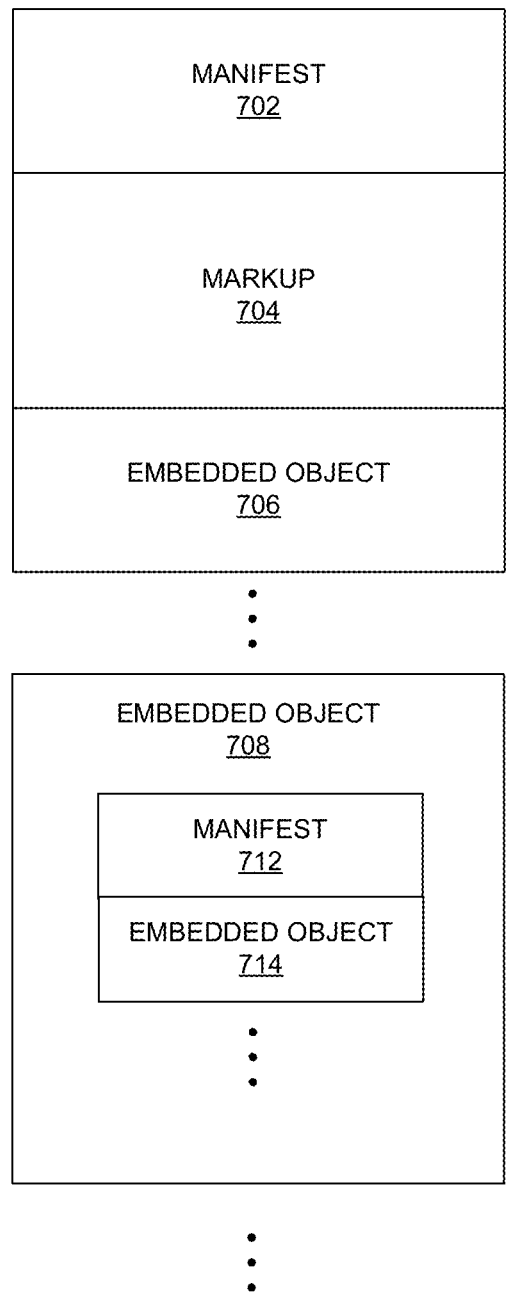
FIG. 7 presents a diagram illustrating an exemplary recursive all-in-one stream, in accordance with an embodiment of the present invention.

In some embodiments, an object embedded in the payload of a stream chunk may also be an all-in-one stream itself. For example, an HTML file may reference frames of other HTML files or other objects, which could themselves be organized as an all-in-one stream. FIG. 7 presents a diagram illustrating an exemplary recursive all-in-one stream, in accordance with an embodiment of the present invention. In FIG. 7, all-in-one stream 700 includes a manifest 702 and a number of content components, such as a markup document 704, embedded objects 706 and 708, etc. More specifically, embedded object 708 itself is an all-in-one stream, which includes a manifest 712 and other content components, such as an embedded object 714. Note that, in such a situation, the parent manifest (manifest 702) treats embedded all-in-one stream 708 the same way as any other embedded objects by listing its stream name, range of chunks, and hash values of its chunks. Note that the corresponding Content Objects included in all-in-one stream 700, including the Content Objects carrying embedded all-in-one stream 708, are given the name prefix of all-in-one stream 700.

Figure 8:
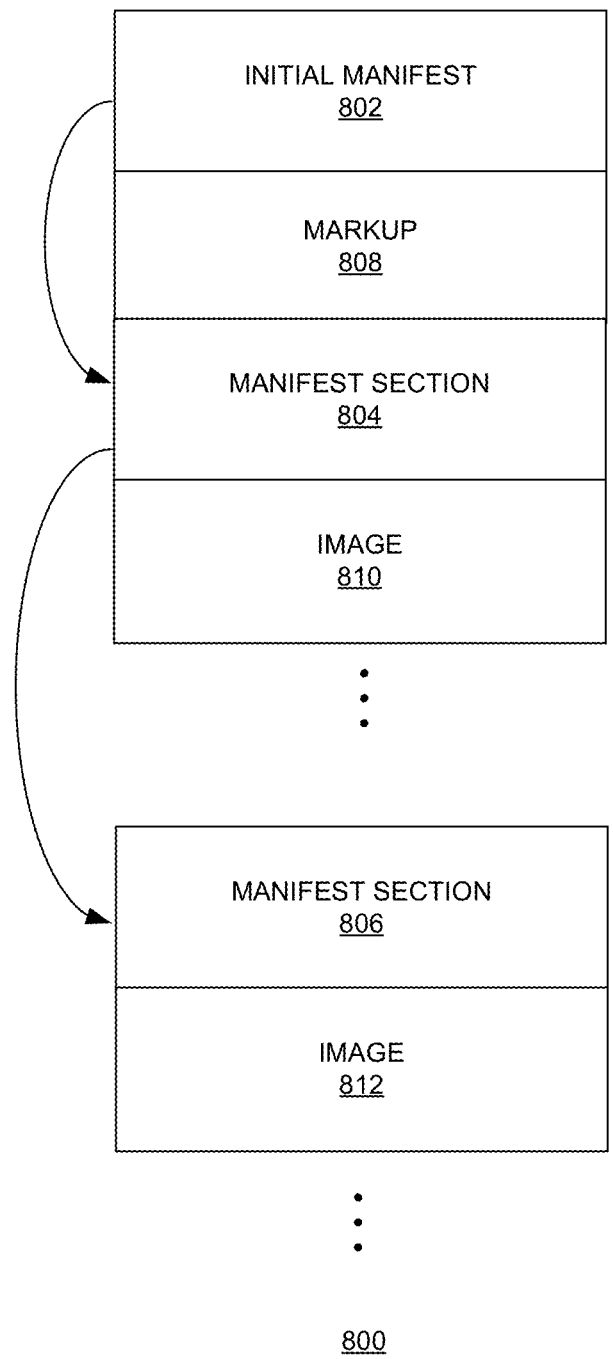
FIG. 8 presents a diagram illustrating an exemplary all-in-one stream with a multiple-section manifest, in accordance with an embodiment of the present invention.

A content collection may include many embedded objects and each embedded object may span many Content Objects, such as a web page that contains a large number of high-resolution images. In such a situation, listing all embedded objects in a single manifest may result in the manifest being too big itself for efficient download. To improve manifest-download efficiency, in some embodiments, a large manifest that lists many embedded objects may be reorganized into a number of smaller manifests scattered at different locations within the all-in-one stream. FIG. 8 presents a diagram illustrating an exemplary all-in-one stream with a multiple-section manifest, in accordance with an embodiment of the present invention. In FIG. 8, all-in-one stream 800 includes a number of manifest sections, such as an initial manifest section 802 and manifest sections 804 and 806; and a number of content components, such as a markup document 808, image files 810 and 812, etc. Instead of listing all embedded objects in initial manifest section 802, initial manifest section 802 may only contain information of markup document 808 and a pointer to a subsequent manifest, manifest section 804. This allows the requester to download, using an initial Interest window, initial manifest 802 and markup document 808, which include important web page information. The pointer included in initial manifest 802 enables the requester to request the subsequent manifest section. Organizing the manifest into multiple sections allows the requester to download portions of a web page while determining whether it has certain embedded objects in its cache already, and to skip downloading such objects if they are in the local cache.

In situations where large content components (such as high-resolution images) exist, instead of listing Content Object hash values of all Content Objects in the manifest, the manifest may list only a few initial Content Object hashes of each embedded object. For example, an embedded image may span a few hundred Content Objects; instead of listing the hash values of these hundreds of Content Objects, the manifest may only list the initial few (such as 10%) hash values. These few hash values should provide enough information to allow a requester to determine whether it already has the image in its cache or to begin downloading the image, may be from a nearby location, under its own name space.

In some embodiments, a requester may be interested in changes to the content since a previoud download. In such a situation, the requester can include in the Interest messages a "modified since" parameter. When such Interests are received, the responder includes, in the all-in-one stream and/or its manifest, only embedded objects that are modified after the "modified since" parameter. This allows a requester to skip the downloading of old files, such as old photos, while downloading a web page. In a variation, the all-in-one stream can include older objects that are newly referenced. For example, if an old photo has not been included in the web page manifest in a long time, it may be included in the all-in-one stream even though it has not been modified since the "modified since" parameter specified in the Interests. Moreover, the response can also order the components in the all-in-one stream by their modification time, such that the most recently (or the least recently) modified content component comes first in the all-in-one stream.

In some embodiments, the all-in-one stream can be compressed.

Figure 9:
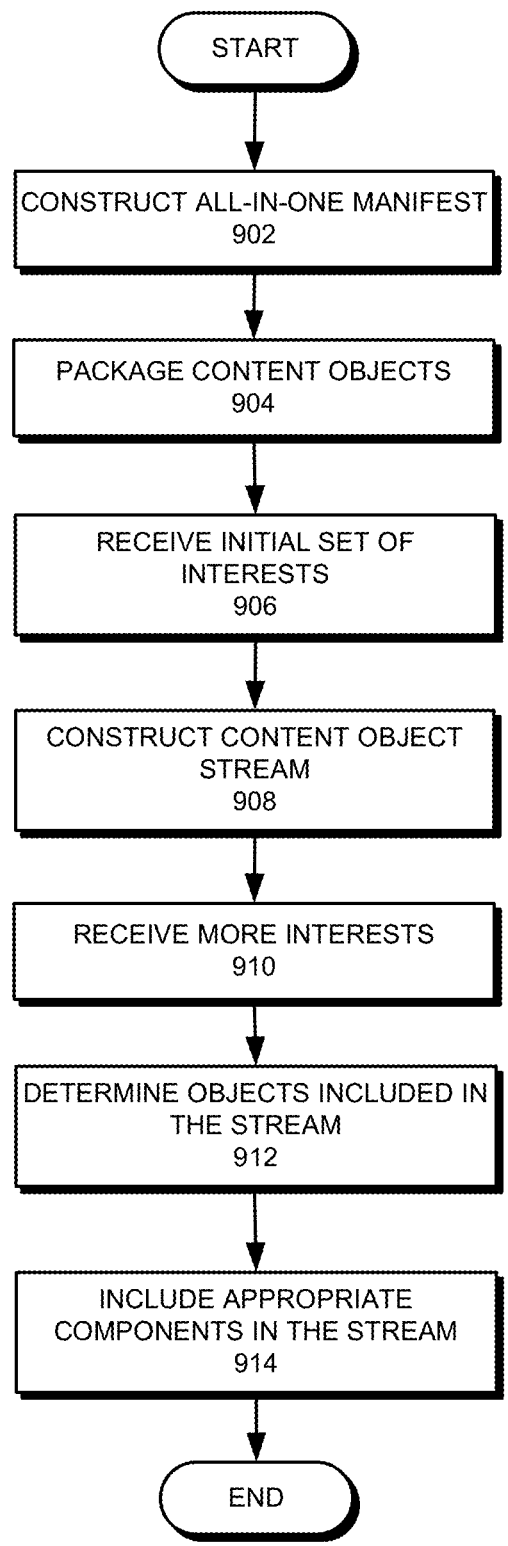
FIG. 9 presents a diagram illustrating a process of constructing an all-in-one stream that can be used to download a content collection, in accordance with an embodiment of the present invention.

FIG. 9 presents a diagram illustrating an exemplary process of constructing an all-in-one stream that can be used to download a content collection, in accordance with an embodiment of the present invention. During operation, the content provider, such as a publisher, constructs an all-in-one manifest for the content collection (operation 902). In some embodiments, the manifest includes an ordered list of content components within the collection. Each entry in the ordered list includes an object name field that specifies the CCN name of a corresponding content component, a chunk-number field that lists the chunk numbers occupied by the content component within the all-in-one stream, and a chunk-hash field that lists the hash values of the first few or all chunks of the content component.

The content provider further packages the constructed manifest along with the content components into standard Content Objects (operation 904). In some embodiments, the Content Objects conform to CCN standards. Note that each Content Object is assigned a stream name, and all Content Objects in the stream have the same name prefix. Subsequently, the content provider receives a set of initial Interest requests under the name space of the stream (operation 906), and in response, the content provider constructs a stream of Content Objects, starting with the manifest, based on the received Interests and parameters included in the initial Interest requests (operation 908). In some embodiments, while constructing the stream, the content provider can order the content components in a way that optimizes a system feature, such as facilitating faster rendering by the client. In further embodiments, content components that are required for the beginning of rendering, such as HTML files in the case of a webpage, are placed at the beginning of the stream, thus optimizing the rendering time. In some embodiments, the parameters included in the Interest requests may include a "modified since" parameter. In further embodiments, while constructing the stream, the content provider can place the newest (the most recently modified) content components at the beginning of the stream in order to minimize the number of chunks that need to be transferred, as the client may already has some of the older components. Note that once the requester receives the manifest, it may include, in subsequent Interests, parameters that are determined based on information included in the manifest. For example, the requester may skip one or more content components based on the hashes listed in the manifest, which may indicate that those components are in the requester's cache already.

The content provider continues to receive Interests from the requester (operation 910), determines the content components to be included in the stream based on the received Interests (operation 912), and continuously constructs the stream by including the appropriate components (operation 914).

Computer and Communication System

Figure 10:
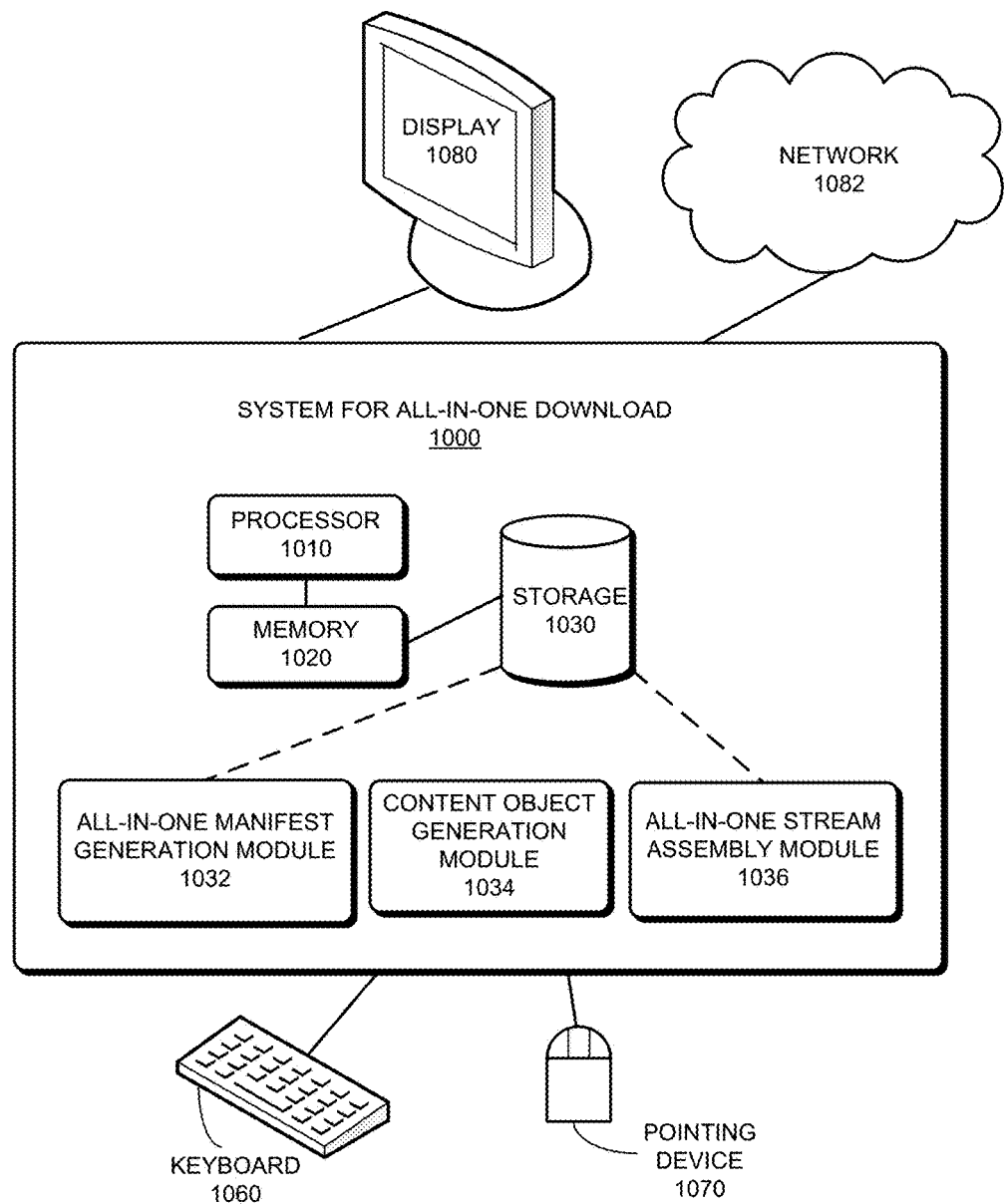
FIG. 10 illustrates an exemplary system that enables all-in-one stream for content download, in accordance with an embodiment of the present invention.

FIG. 10 illustrates an exemplary system that enables all-in-one stream for content download, in accordance with an embodiment of the present invention. A system 1000 for all-in-one download comprises a processor 1010, a memory 1020, and a storage 1030. Storage 1030 typically stores instructions that can be loaded into memory 1020 and executed by processor 1010 to perform the methods mentioned above. In one embodiment, the instructions in storage 1030 can implement an all-in-one manifest generation module 1032, a Content Object generation module 1034, and an all-in-one stream assembly module 1036, all of which can be in communication with each other through various means.

In some embodiments, modules 1032, 1034, and 1036 can be partially or entirely implemented in hardware and can be part of processor 1010. Further, in some embodiments, the system may not include a separate processor and memory. Instead, in addition to performing their specific tasks, modules 1032, 1034, and 1036, either separately or in concert, may be part of general- or special-purpose computation engines.

Storage 1030 stores programs to be executed by processor 1010. Specifically, storage 1030 stores a program that implements a system (application) for enabling all-in-one content download. During operation, the application program can be loaded from storage 1030 into memory 1020 and executed by processor 1010. As a result, system 1000 can perform the functions described above. System 1000 can be coupled to an optional display 1080 (which can be a touch screen display), keyboard 1060, and pointing device 1070, and can also be coupled via one or more network interfaces to network 1082.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-executable method for assembling a single content stream that enables downloading of a content collection using the single content stream over a content-centric network, comprising:

receiving, from a requester, a set of Interests under a same namespace;

obtaining the content collection that includes a plurality of content components, wherein each content component has a modification time;

generating a manifest for the content collection, wherein a respective entry in the manifest corresponds to a content component;

determining, from the plurality of content components, which content components to include in the single content stream;

assembling the single content stream by including the manifest followed by the plurality of content components in order, wherein the manifest and the content components are packaged into objects under the same namespace as the set of Interests, wherein each of the objects specifies a same name prefix, and each of the interests specifies the same name prefix as the objects, wherein one or more content components that are required for rendering the content collection are placed at a beginning of the single content stream, and wherein the plurality of content components are placed in order based on the modification times with the content component having the most recent modification time or the least recent modification time placed first, thereby facilitating a requester requesting one or more content components within the content collection using interests under the same namespace.

2. The method of claim 1, wherein the content component spans multiple chunks within the single content stream with each chunk corresponding to a packaged object and being assigned a sequence number, and wherein the entry in the manifest specifies sequence numbers of the multiple chunks.

3. The method of claim 2, wherein the entry in the manifest further specifies hash values of one or more of the multiple chunks of the content component, thereby enabling the requester to determine whether a copy of the content component exists in the requester's local cache by checking the hash values.

4. The method of claim 1, wherein the objects are standard content-centric network Content Objects; and wherein at least one Content Object in the single content stream includes key information, and wherein a respective Content Object includes a cryptographic signature associated with the key.

5. The method of claim 1, wherein a content component includes a second single content stream, and wherein the second single content stream includes a second manifest.

6. The method of claim 1, wherein the manifest includes multiple segments, and wherein the multiple segments of the manifest are scattered at different locations within the single content stream.

7. A non-transitory computer-readable storage medium storing instructions that when executed by a computing device cause the computing device to perform a method for assembling a single content stream that enables downloading of a content collection using the single content stream over a content-centric network, the method comprising:

receiving, from a requester, a set of Interests under a same namespace;

obtaining the content collection that includes a plurality of content components, wherein each content component has a modification time;

generating a manifest for the content collection, wherein a respective entry in the manifest corresponds to a content component;

determining, from the plurality of content components, which content components to include in the single content stream;

assembling the single content stream by including the manifest followed by the plurality of content components in order, wherein the manifest and the content components are packaged into objects under the same namespace as the set of Interests, wherein each of the objects specifies a same name prefix, and each of the interests specifies the same name prefix as the objects, wherein one or more content components that are required for rendering the content collection are placed at a beginning of the single content stream, and wherein the plurality of content components are placed in order based on the modification times with the content component having the most recent modification time or the least recent modification time placed first, thereby facilitating a requester requesting one or more content components within the content collection using interests under the same namespace.

8. The computer-readable storage medium of claim 7, wherein the content component spans multiple chunks within the single content stream with each chunk corresponding to a packaged object and being assigned a sequence number, and wherein the entry in the manifest specifies sequence numbers of the multiple chunks.

9. The computer-readable storage medium of claim 8, wherein the entry in the manifest further specifies hash values of one or more of the multiple chunks of the content component, thereby enabling the requester to determine whether a copy of the content component exists in the requester's local cache by checking the hash values.

10. The computer-readable storage medium of claim 7, wherein the objects are standard content-centric network Content Objects; and wherein at least one Content Object in the single content stream includes key information, and wherein a respective Content Object includes a cryptographic signature associated with the key.

11. The computer-readable storage medium of claim 7, wherein a content component includes a second single content stream, and wherein the second single content stream includes a second manifest.

12. The computer-readable storage medium of claim 7, wherein the manifest includes multiple segments, and wherein the multiple segments of the manifest are scattered at different locations within the single content stream.

13. A computer system for assembling a single content stream that enables downloading of a content collection using the single content stream over a content-centric network, the system comprising:

a processor; and a storage device coupled to the processor and storing instructions which when executed by the processor cause the processor to perform a method, the method comprising:

receiving, from a requester, a set of Interests under a same namespace;

obtaining the content collection that includes a plurality of content components, wherein each content component has a modification time;

generating a manifest for the content collection, wherein a respective entry in the manifest corresponds to a content component;

determining, from the plurality of content components, which content components to include in the single content stream;

assembling the single content stream by including the manifest followed by the plurality of content components in order, wherein the manifest and the content components are packaged into objects under the same namespace as the set of Interests, wherein each of the objects specifies a same name prefix, and each of the interests specifies the same name prefix as the objects, wherein one or more content components that are required for rendering the content collection are placed at a beginning of the single content stream, and wherein the plurality of content components are placed in order based on the modification times with the content component having the most recent modification time or the least recent modification time placed first, thereby facilitating a requester requesting one or more content components within the content collection using interests under the same namespace, wherein each of the interests specifies the same name prefix as the objects.

14. The system of claim 13, wherein the content component spans multiple chunks within the single content stream with each chunk corresponding to a packaged object and being assigned a sequence number, and wherein the entry in the manifest specifies sequence numbers of the multiple chunks.

15. The system of claim 14, wherein the entry in the manifest further specifies hash values of one or more of the multiple chunks of the content component, thereby enabling the requester to determine whether a copy of the content component exists in the requester's local cache by checking the hash values.

16. The system of claim 13, wherein the objects are standard content-centric network Content Objects; and wherein at least one Content Object in the single content stream includes key information, and wherein a respective Content Object includes a cryptographic signature associated with the key.

17. The system of claim 13, wherein a content component includes a second single content stream, and wherein the second single content stream includes a second manifest.

18. The system of claim 13, wherein the manifest includes multiple segments, and wherein the multiple segments of the manifest are scattered at different locations within the single content stream.

* * * * *